(12) United States Patent
Zähe

(10) Patent No.: US 10,437,269 B1
(45) Date of Patent: Oct. 8, 2019

(54) ELECTROHYDRAULIC COUNTERBALANCE AND PRESSURE RELIEF VALVE

(71) Applicant: Sun Hydraulics, LLC, Sarasota, FL (US)

(72) Inventor: Bernd Zähe, Sarasota, FL (US)

(73) Assignee: SUN HYDRAULICS, LLC, Sarasota, FL (US)

( * ) Notice: Subject to any disclaimer, the term of this patent is extended or adjusted under 35 U.S.C. 154(b) by 160 days.

(21) Appl. No.: 15/726,679

(22) Filed: Oct. 6, 2017

(51) Int. Cl.
*G05D 16/20* (2006.01)
*F16K 31/122* (2006.01)
*F16K 31/42* (2006.01)
*F16K 17/04* (2006.01)

(52) U.S. Cl.
CPC ....... *G05D 16/2093* (2013.01); *F16K 17/044* (2013.01); *F16K 31/1221* (2013.01); *F16K 31/42* (2013.01); *Y10T 137/777* (2015.04); *Y10T 137/7766* (2015.04)

(58) Field of Classification Search
CPC ......... Y10T 137/7766; Y10T 137/7769; Y10T 137/777; G05D 16/2093; F16K 17/044; F16K 31/10; F16K 31/42
USPC ......... 137/491, 492, 492.5; 251/30.04, 30.05
See application file for complete search history.

(56) References Cited

U.S. PATENT DOCUMENTS

| | | | | |
|---|---|---|---|---|
| 2,379,181 A * | 6/1945 | Pontius | ................. | F16K 31/408 251/30.04 |
| 2,575,272 A * | 11/1951 | Harris | .................. | F16K 31/408 251/30.04 |
| 2,687,869 A * | 8/1954 | Kanuch | ................... | F15B 13/02 251/30.04 |
| 3,033,228 A * | 5/1962 | Mohler | .................. | F16K 31/408 137/490 |
| 3,381,931 A * | 5/1968 | Boonshaft | ........... | F15B 13/0431 251/30.05 |
| 4,289,160 A * | 9/1981 | Kawasaki | ............. | F16K 17/105 137/491 |
| 4,303,197 A * | 12/1981 | Sandau | ................. | F15B 21/042 137/468 |
| 4,336,903 A * | 6/1982 | Zirps | ..................... | F15B 21/042 137/468 |
| 4,351,356 A * | 9/1982 | Koiwai | ................. | F16K 17/105 137/491 |
| 4,454,982 A * | 6/1984 | Reick | .................... | G05D 23/022 137/491 |
| 4,456,170 A * | 6/1984 | Weigle | ................. | F15B 21/042 137/491 |
| 4,494,726 A * | 1/1985 | Kumar | .................. | F16K 31/408 251/29 |
| 4,679,765 A * | 7/1987 | Kramer | ................. | F16K 31/408 251/282 |

(Continued)

*Primary Examiner* — William M McCalister
(74) *Attorney, Agent, or Firm* — McDonnell Boehnen Hulbert & Berghoff LLP

(57) ABSTRACT

An example valve includes a main stage and a pilot stage. The pilot stage includes a pilot poppet that is axially movable, a pilot piston, and a pilot spring applying a biasing force on the pilot poppet. The valve further includes a pilot seat member disposed between the main stage and the pilot stage and configured to form a pilot seat for the pilot poppet. When a pilot pressure fluid signal is received through a pilot port, the pilot pressure fluid signal applies a pressure on the pilot piston causing the pilot piston to move axially, thereby reducing the biasing force applied by the pilot spring on the pilot poppet.

18 Claims, 7 Drawing Sheets

(56) References Cited

U.S. PATENT DOCUMENTS

| | | | | |
|---|---|---|---|---|
| 5,048,790 A * | 9/1991 | Wells | F16K 31/408 | 251/30.04 |
| 5,051,631 A * | 9/1991 | Anderson | F16K 31/406 | 310/14 |
| 5,144,881 A * | 9/1992 | Caknnaz | B60T 8/3665 | 91/451 |
| 5,195,556 A * | 3/1993 | Fassbender | F16K 17/105 | 137/491 |
| 5,404,902 A * | 4/1995 | Wen | F16K 31/42 | 137/489 |
| 5,769,386 A * | 6/1998 | Sugiura | G05D 16/2097 | 251/37 |
| 5,836,335 A * | 11/1998 | Harms | F15B 13/0402 | 137/14 |
| 5,842,679 A * | 12/1998 | Kolchinsky | F16K 31/408 | 251/30.04 |
| 6,039,070 A * | 3/2000 | Zaehe | G05D 16/106 | 137/491 |
| 6,378,557 B2 * | 4/2002 | Kawamura | F16H 61/0251 | 137/625.64 |
| 6,390,441 B2 * | 5/2002 | Koyama | F16K 31/408 | 251/30.03 |
| 6,805,155 B2 * | 10/2004 | Slawinski | F16K 17/105 | 137/489 |
| 6,957,656 B2 * | 10/2005 | Tochiyama | F16K 31/0665 | 137/14 |
| 6,986,498 B2 * | 1/2006 | Hirota | F16K 31/406 | 251/30.03 |
| 7,051,857 B2 * | 5/2006 | Babin | F16D 43/284 | 137/539.5 |
| 7,779,853 B2 * | 8/2010 | Reilly | F15B 13/0402 | 137/14 |
| 7,841,360 B2 * | 11/2010 | Bruck | F15B 13/024 | 137/625.68 |
| 7,975,981 B2 * | 7/2011 | Harrison, Jr. | A01B 79/005 | 251/129.15 |
| 7,984,890 B2 * | 7/2011 | Pfaff | F15B 13/0405 | 137/269 |
| 8,375,981 B2 * | 2/2013 | Jeon | F16K 17/105 | 137/491 |
| 8,733,391 B2 * | 5/2014 | Jeon | F15B 13/024 | 137/488 |
| 8,757,208 B2 | 6/2014 | Dornbach et al. | | |
| 2003/0106588 A1 * | 6/2003 | Zahe | F16K 17/10 | 137/491 |
| 2003/0131889 A1 * | 7/2003 | Kim | F16K 1/42 | 137/491 |
| 2005/0178443 A1 * | 8/2005 | Cheong | F16K 17/105 | 137/491 |
| 2005/0183775 A1 * | 8/2005 | Cheong | F15B 13/024 | 137/491 |
| 2006/0201554 A1 * | 9/2006 | Prinsen | F16K 17/0433 | 137/491 |
| 2006/0266419 A1 * | 11/2006 | Krug-Kussius | F16K 17/105 | 137/491 |
| 2009/0050222 A1 * | 2/2009 | Jackson | F15B 11/042 | 137/625.65 |
| 2010/0294380 A1 * | 11/2010 | Nagata | F16K 31/408 | 137/487.5 |
| 2011/0139260 A1 * | 6/2011 | Dornbach | F16K 27/041 | 137/12 |
| 2014/0299197 A1 | 10/2014 | Dornbach et al. | | |

* cited by examiner

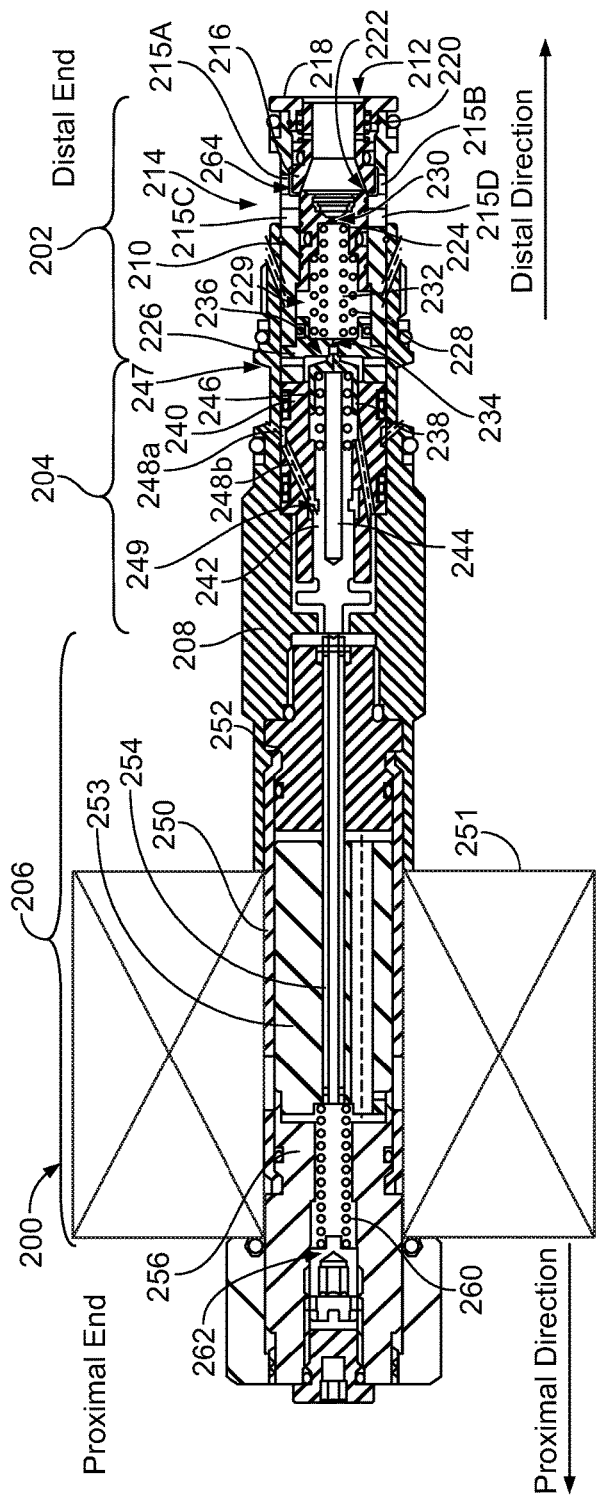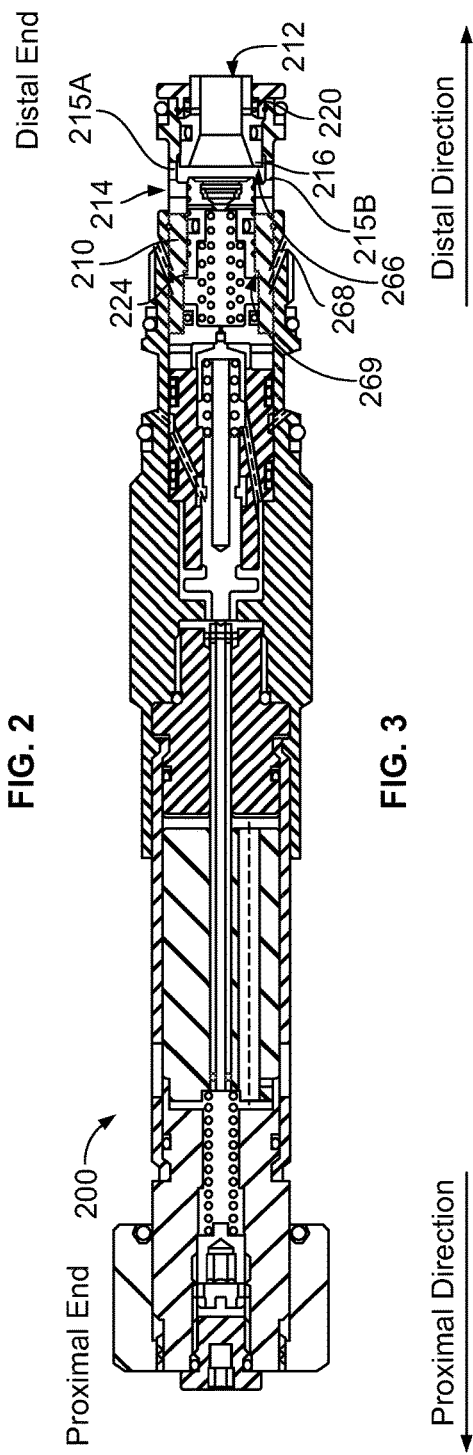
FIG. 2
FIG. 3

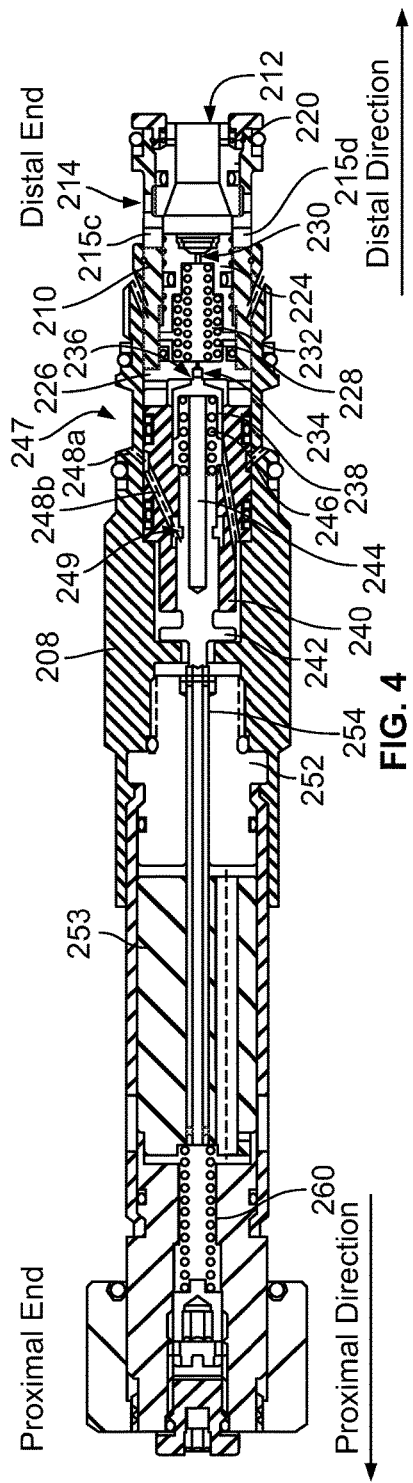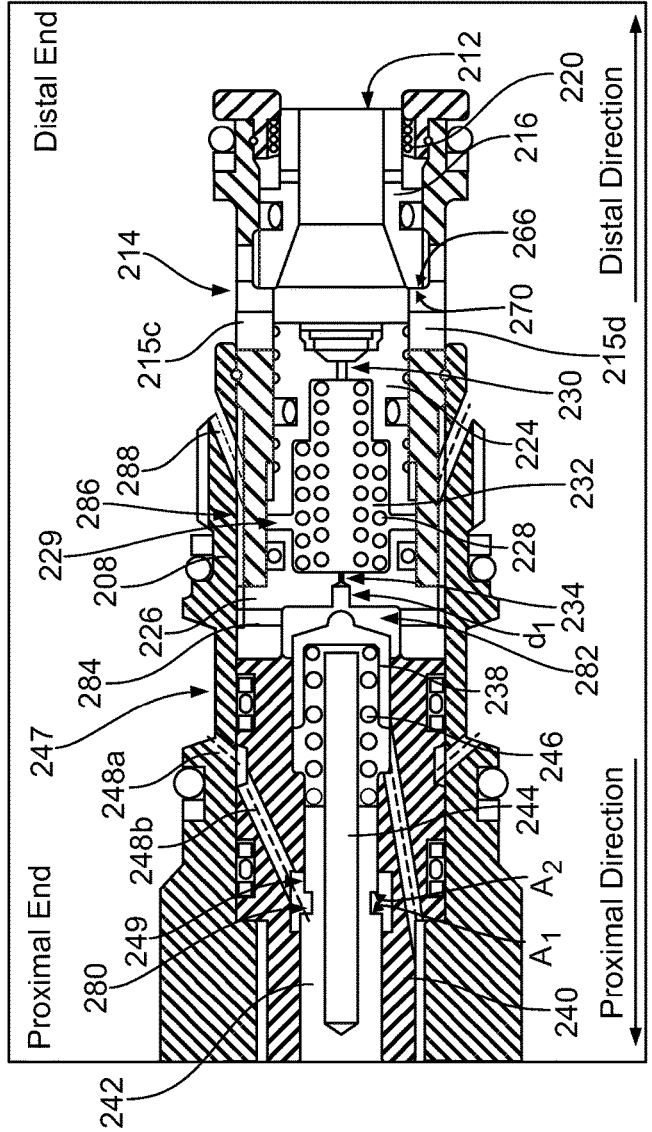
FIG. 4
FIG. 5

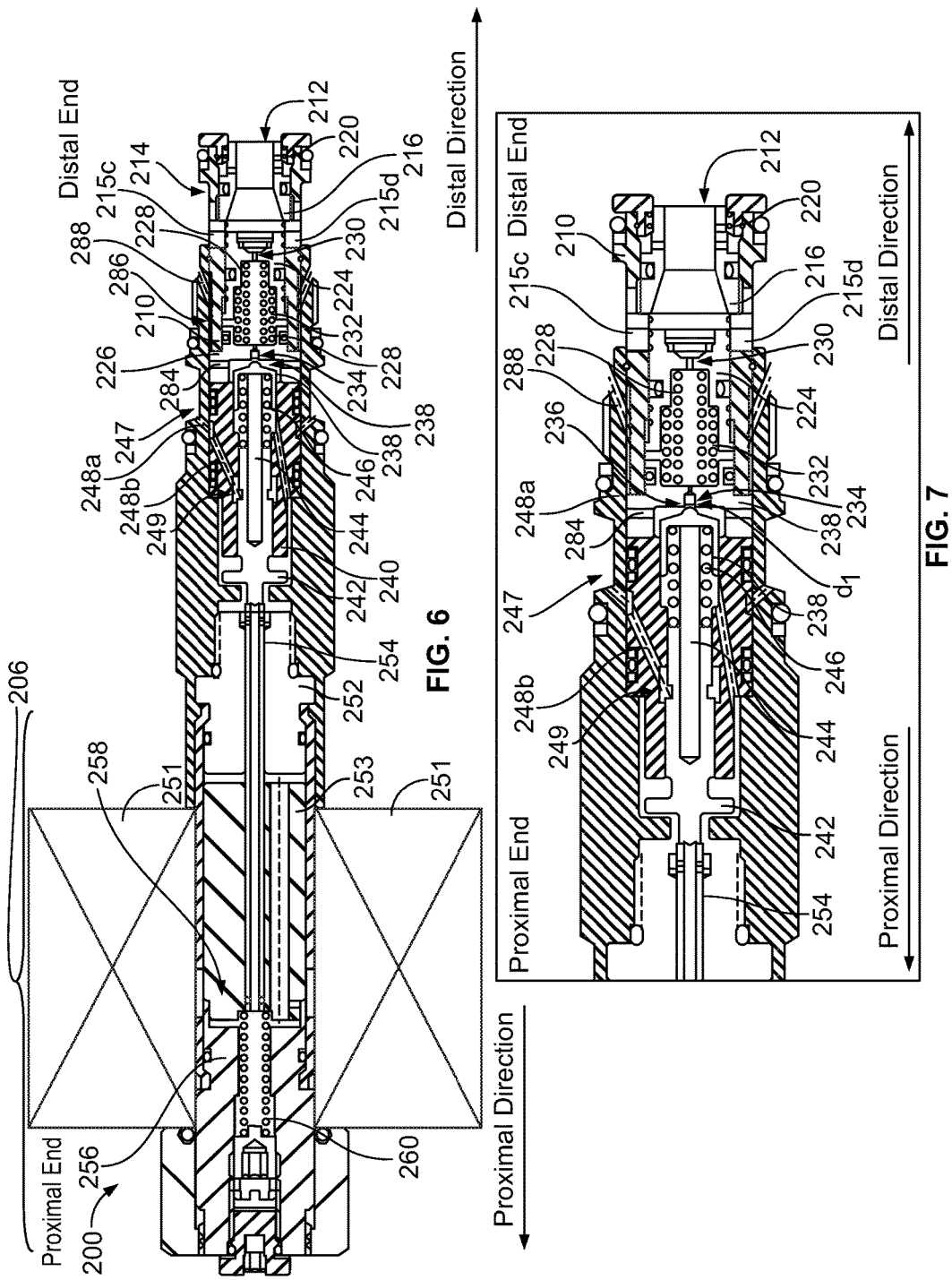

ELECTROHYDRAULIC COUNTERBALANCE AND PRESSURE RELIEF VALVE

BACKGROUND

Counterbalance valves are hydraulic valves configured to hold and control negative or gravitational loads. They may be configured to operate, for example, in applications that involve the control of suspended loads, such as mechanical joints, lifting applications, extensible movable bridge, winches, etc.

In some applications, the counterbalance valve, which may also be referred to as an overcenter valve, could be used as a safety device that prevents an actuator for moving if a failure occurs (e.g., a hose burst) or could be used as a load holding valve (e.g., on a boom cylinder of a mobile machinery). The counterbalance valve allows cavitation-free load lowering, preventing the actuator from overrunning when pulled by the load (gravitational load).

As an example, a pilot-operated counterbalance valve could be used on the return side of a hydraulic actuator for lowering a large negative load in a controlled manner. The counterbalance valve generates a preload or back-pressure in the return line that acts against the main drive pressure so as to maintain a positive load, which therefore remains controllable. Particularly, if a speed of a piston of the cylinder increases, pressure on one side of the cylinder (e.g., rod side) may drop and the counterbalance valve may then act to restrict the flow to controllably lower the load.

When a directional control valve is operating in a load-lowering mode, the pilot-operated counterbalance valve is opened by a pressurized pilot line. To protect both directions of motion of a fluid receiving device against a negative load, a counterbalance valve may be assigned to each of the ports of the fluid receiving device. Each counterbalance valve assigned to a particular port may then be controlled open via cross-over by the pressure present at the other port. In other words, a respective pressurized pilot line that, when pressurized, opens a counterbalance valve is connected to a supply line connected to the other port. A counterbalance valve may also be configured as a pressure relief valve in one flow direction and a check valve for free flow in the opposite direction.

A counterbalance valve may have a spring that acts against a movable element (e.g., a spool or a poppet), and the force of the spring determines a pressure setting of the counterbalance valve. The pressure setting is a pressure level that causes the counterbalance valve to open and allow fluid flow therethrough. In examples, the counterbalance valve is configured to have a pressure setting that is higher (e.g., 30% higher) than an expected maximum induced pressure in an actuator controlled by the counterbalance valve.

However, this configuration may render operation of the counterbalance valve energy inefficient. Particularly, the expected maximum induced pressure might not occur in all working conditions, and configuring the counterbalance valve to handle the expected maximum induced pressure may cause a large amount of energy loss.

For instance, an actuator may operate a particular tool that experiences a high load in some cases; however, the actuator may operate another tool that experiences small load in other cases. In the cases where the actuator operates a tool that experiences a small load, having the counterbalance valve with a high pressure setting is inefficient. The hydraulic system provides a high pilot pressure to open the counterbalance valve, and the counterbalance generates a large backpressure thereby causing the system to consume an extra amount of power or energy that could have been avoided if the counterbalance valve has a lower pressure setting.

As another example, an actuator of a mobile machinery may be coupled to the machine at a hinge and as the actuator rotates about the hinge the kinematics of the actuator change, and the load may increase or decrease based on the rotational position of the actuator. In some rotational positions, the load may be large causing a high induced pressure, but in other rotational positions the load may be small causing a low induced pressure.

Configuring the counterbalance valve to handle the large load and high induced pressure renders operation of the hydraulic system inefficient when the load is small. Due to the high pressure setting of the counterbalance valve, a large pilot pressure is provided to open the counterbalance valve and a large backpressure is generated, whereas for the small load a low pilot pressure could have been used. The increased pressure level multiplied by flow through the actuator results in energy loss that could have been avoided if the pressure setting of the counterbalance valve is lowered based on conditions of the hydraulic system.

Therefore, it may be desirable to have a counterbalance valve with a pressure setting that could be varied during operation of the hydraulic system. Such variation could render the hydraulic system more efficient.

SUMMARY

The present disclosure describes implementations that relate to an electrohydraulic counterbalance and pressure relief Valve. In a first example implementation, the present disclosure describes a valve. The valve includes: (i) a housing having a pilot port on an exterior peripheral surface of the housing; (ii) a main stage; (iii) a pilot stage including (a) a pilot poppet axially movable in the housing, (b) a pilot piston disposed in the housing longitudinally adjacent to the pilot poppet, (c) a pilot pin coupled to the pilot piston and disposed between the pilot piston and the pilot poppet such that the pilot pin contacts the pilot poppet, and (d) a pilot spring disposed about an exterior peripheral surface of the pilot pin between the pilot piston and the pilot poppet, such that the pilot spring applies a biasing force on the pilot poppet in a closing direction; and (iv) a pilot seat member disposed between the main stage and the pilot stage, where the pilot seat member is configured to form a pilot seat for the pilot poppet. When a pilot pressure fluid signal is received through the pilot port of the housing, the pilot pressure fluid signal applies a pressure on the pilot piston causing the pilot piston to move axially in an opening direction, thereby causing the pilot pin to separate from the pilot poppet and reducing the biasing force applied by the pilot spring on the pilot poppet to facilitate unseating the pilot poppet.

In a second example implementation, the present disclosure describes another valve. The valve includes: (i) a main stage; (ii) a pilot stage including: (a) a pilot sleeve, (b) a pilot poppet disposed within the pilot sleeve and axially movable therein, (c) a pilot piston disposed within the pilot sleeve longitudinally adjacent to the pilot poppet, and (d) a pilot spring floating between the pilot piston and the pilot poppet such that the pilot spring applies a first biasing force on the pilot poppet in a closing direction; (iii) a pilot seat member disposed between the main stage and the pilot stage, where the pilot seat member is configured to form a pilot seat for the pilot poppet, and where when a pilot pressure fluid signal is received through a pilot port, the pilot pressure fluid signal applies a pressure on the pilot piston causing the pilot piston to move axially in an opening direction, thereby reducing the first biasing force applied by the pilot spring on the pilot poppet; and (iv) a solenoid actuation mechanism including: (a) a solenoid tube, (b) a solenoid coil disposed about the solenoid tube, (c) an armature disposed in the solenoid tube and axially movable therein, (d) a solenoid pin disposed in the solenoid tube and in the armature, such that the solenoid pin is axially movable within the armature, and (e) a solenoid spring interacting with the solenoid pin and configured to apply a second biasing force on the pilot poppet in the closing direction via the pilot piston and the pilot spring.

In a third example implementation, the present disclosure describes a hydraulic system including: a source of pressurized fluid; a reservoir; a hydraulic actuator having a first chamber and a second chamber; a directional control valve configured to direct fluid flow from the source of pressurized fluid to the first chamber of the hydraulic actuator; and a valve configured to control fluid flow from the second chamber. The valve includes (i) a main stage; (ii) a pilot stage comprising: (a) a pilot sleeve, (b) a pilot poppet disposed within the pilot sleeve and axially movable therein, (c) a pilot piston disposed within the pilot sleeve longitudinally adjacent to the pilot poppet, and (d) a pilot spring disposed between the pilot piston and the pilot poppet such that the pilot spring applies a biasing force on the pilot poppet in a closing direction; and (iii) a pilot seat member disposed between the main stage and the pilot stage, where the pilot seat member is configured to form a pilot seat for the pilot poppet. When a pilot pressure fluid signal is received through a pilot port fluidly coupled to the first chamber of the hydraulic actuator, the pilot pressure fluid signal applies a pressure on the pilot piston causing the pilot piston to move axially in an opening direction, thereby reducing the biasing force applied by the pilot spring on the pilot poppet to facilitate unseating the pilot poppet.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 2 illustrates a cross sectional view of a valve in a closed position, in accordance with an example implementation.

FIG. 3 illustrates operation of the valve shown in FIG. 2 to allow free flow from a port to another port, in accordance with another example implementation.

FIG. 4 illustrates a cross-sectional view of the valve of FIG. 2 in pilot modulation mode of operation, in accordance with an example implementation.

FIG. 5 illustrates a zoomed-in view of the cross section view of FIG. 4, in accordance with an example implementation.

FIG. 6 illustrates adjusting a pressure setting of the valve of FIG. 2 via a solenoid actuation mechanism, in accordance with an example implementation.

FIG. 7 illustrates a zoomed-in view of a cross section of the valve shown in FIG. 2 in a pressure relief mode, in accordance with an example implementation.

DETAILED DESCRIPTION

In example implementations, a counterbalance valve is configured to restrict flow forced out of an actuator in response to a pressure induced by a load to which the actuator is subjected. This way, the counterbalance valve may prevent the actuator from overrunning under negative loads. It may be desirable to be able change a pressure setting of the counterbalance valve when the load varies, where the pressure setting is a pressure level that causes the counterbalance valve to open and allow fluid flow therethrough. For instance, it may be desirable to be able reduce the pressure setting of the counterbalance valve such that in cases where the load is a positive load (e.g., the actuator is not overrunning), the restriction caused by the counterbalance valve is reduced. This way, the pressure level in the system could thus be reduced, and the hydraulic system may operate more efficiently.

Figure 1:
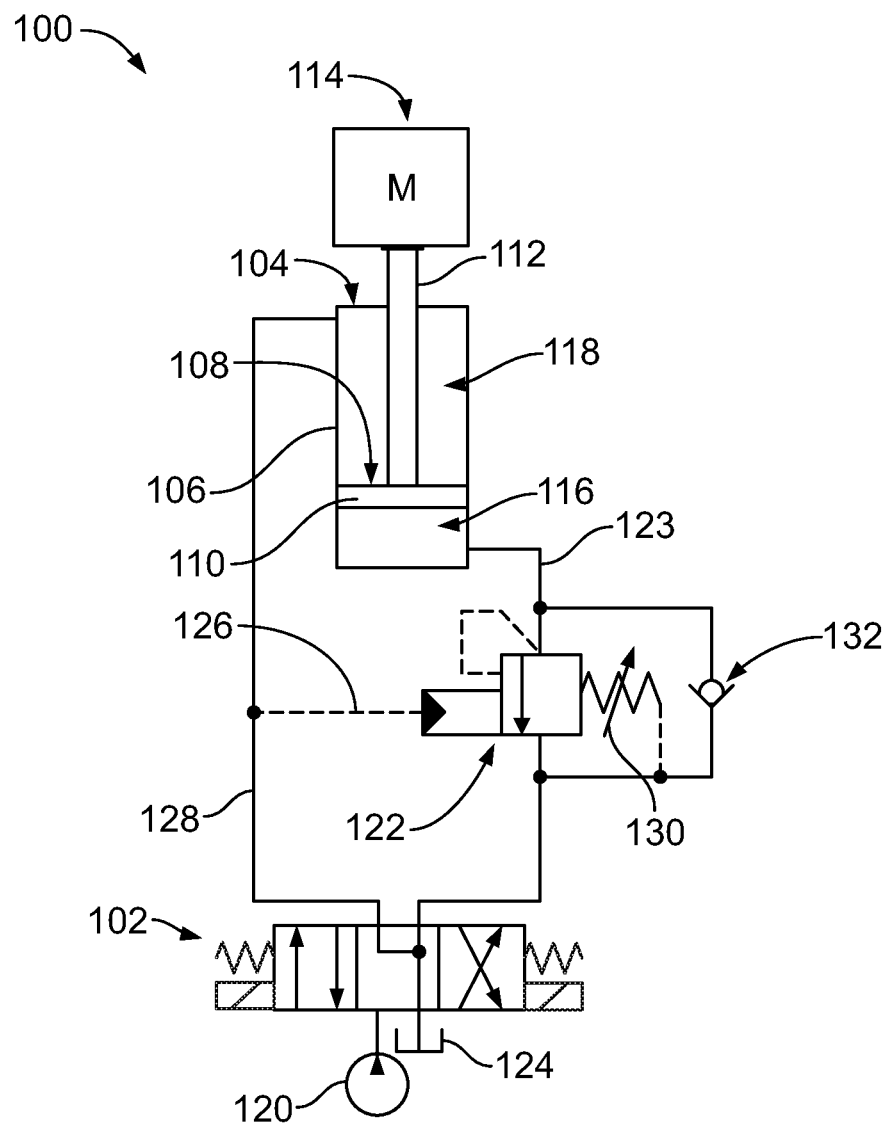
FIG. 1 illustrates a hydraulic circuit, in accordance with an example implementation.

FIG. 1 illustrates a hydraulic circuit 100, in accordance with an example implementation. The hydraulic circuit 100 includes a directional control valve 102 configured to control flow to and from an actuator 104. The actuator 104 includes a cylinder 106 and a piston 108 slidably accommodated in the cylinder 106. The piston 108 includes a piston head 110 and a rod 112 extending from the piston head 110 along a central longitudinal axis direction of the cylinder 106. The rod 112 is coupled to a load 114. The piston head 110 divides the inside of the cylinder 106 into a first chamber 116 and a second chamber 118.

In an example operation, the direction control valve 102 directs fluid flow received from a source of pressurized fluid, such as a pump 120, to the chamber 118 to lower the load 114, where the load 114 is a negative load that acts with gravity. Thus, the weight of the load 114 may force fluid out of the chamber 116 causing the load to drop uncontrollably. Further, flow from the pump 120 might not be able to keep up with movement of the piston 108, causing cavitation in the chamber 118.

To avoid uncontrollable lowering of the load 114 and cavitation in the chamber 118, a counterbalance valve 122 is installed in a hydraulic line 123 leading from the chamber 116 to the directional control valve 102. The counterbalance valve 122 is configured to control or restrict fluid forced out of the chamber 116. Fluid exiting the counterbalance valve 122 then flows through the direction control valve 102 to a reservoir or tank 124.

A pilot line 126 tapped from a hydraulic line 128 connecting the directional control valve 102 to the actuator 104 is fluidly coupled to a pilot port of the counterbalance valve 122. A pilot pressure fluid signal received through the pilot line 126 acts together with the pressure induced in the chamber 116 and the hydraulic line 123 due to the load 114, against a force generated by a setting spring 130 of the counterbalance valve 122. The combined action of the pilot pressure fluid signal and the induced pressure in the chamber 116 facilitates opening the counterbalance valve 122 to allow flow therethrough.

The counterbalance valve 122 is characterized by a ratio between a surface area on which the pilot pressure fluid signal acts and a surface area on which the pressure induced by the load 114 acts within the counterbalance valve 122. Such ratio may be referred to as "pilot ratio."

Because the pilot pressure fluid signal acts against the setting spring 130, the pilot pressure fluid signal effectively reduces the pressure setting determined by a spring rate of the setting spring 130. The extent of reduction in the pressure setting is determined by the pilot ratio. For example, if the pilot ratio is 3 to 1 (3:1), then for each 10 bar increase in pressure level of the pilot pressure fluid signal, the pressure setting of the setting spring 130 is reduced by 30 bar. As another example, if the pilot ratio is 8 to 1 (8:1), then for each 10 bar increase in the pressure level of pilot pressure fluid signal, the pressure setting of the setting spring 130 is reduced by 80 bar.

If the piston 108 tends to increase its speed, pressure level in the chamber 118, the hydraulic line 128, and the pilot line 126 may decrease. As a result, the counterbalance valve 122 restricts fluid flow therethrough to preclude the load 114 from dropping at large speeds (i.e., precludes the load 114 and the actuator 104 from overrunning).

Although the hydraulic circuit 100 depicts one counterbalance valve 122, in other examples, the hydraulic circuit 100 may include a second counterbalance valve configured to control fluid flow forced out of the chamber 118 when the piston 108 extends. In these examples, the counterbalance valve 122 may be configured to allow fluid flow through a free-flow check valve 132 from the directional control valve 102 to the chamber 116. The second counterbalance valve and associated hydraulic line connections are not shown in FIG. 1 to reduce visual clutter in the drawings.

The pressure setting determined by the spring rate of the setting spring 130 is selected such that the counterbalance valve 122 is configured to hold a maximum expected load. For example, if a diameter of the piston head 110 is 40 millimeter (mm) and a diameter of the rod 112 is 28 mm, then an annular area of the piston 108 (e.g., surface area of the piston head 110 minus a cross sectional area of the piston rod 112) is equal to 640.56 millimeter squared. Thus, for an example maximum value of the load 114 being 10 kilo Newton (KN), the maximum induced pressure in the chamber 116 can be estimated as the maximum force divided by the annular area and is thus equal to about 156 bar.

The setting spring 130 is selected to cause the counterbalance valve 122 to have a pressure setting that is higher than the maximum induced pressure so as to be able to hold the load 114. For example, the setting spring 130 may be selected to cause the counterbalance valve 122 to have a pressure setting of 210 bar.

As such, to open the counterbalance valve 122 and allow flow therethrough, the pilot pressure fluid signal and the induced pressure in the chamber 118 apply respective forces within the counterbalance valve 122 that overcome the force caused by the setting spring 130. This configuration may render the hydraulic circuit 100 inefficient.

Particularly, in some cases, the load 114 might not be an overrunning load (i.e., might be a positive load), and thus the induced pressure in the chamber 118 may be low. In these cases, to open the counterbalance valve 122, a high pilot pressure is generated in the hydraulic line 128 and is tapped therefrom to be communicated through the pilot line 126 to the pilot port of the counterbalance valve 122. In other words, the pressure level in the hydraulic line 128 rises to provide the high pilot pressure to open the counterbalance valve when the load 114 is not an overrunning load. If the pressure setting determined by the setting spring 130 is lower, then a lower pilot pressure could have opened the counterbalance valve 122.

Fluid power is estimated by a multiplication of pressure level and flow rate through the hydraulic system. Thus, if pressure level is decreased, then the power that the pump 120 consumes to generate the fluid having sufficient power to operate the actuator 104 is also decreased and the hydraulic circuit 100 may operate more efficiently.

Therefore, it may be desirable to configure the counterbalance valve 122 such that the pressure setting of the setting spring 130 can be adjusted during operation of the hydraulic circuit 100. For example, an electronic controller of the hydraulic circuit 100 may be in communication with pressure sensors or load sensors coupled to the actuator 104. The controller may then adjust the pressure setting based on sensor information indicating the pressure level in the chamber 116 or indicating the magnitude of the load 114. Thus, for positive loads and low pressure levels in the chamber 116, the pressure setting could be reduced to render the hydraulic circuit 100 more efficient. The controller may continually adjust the pressure setting of the setting spring 130 during operation of the hydraulic circuit 100 based on the sensor information.

Further, changing pressure setting based on load conditions may enhance stability of the counterbalance valve 122. Enhanced stability of the counterbalance valve 122 indicates fewer oscillations in movable elements of the counterbalance valve 122, and thus fewer oscillations in inlet, pilot, and outlet pressure levels of the counterbalance valve 122. The stability of the counterbalance valve 122 may be based on several factors including the pressure setting, the pilot ratio, and the capacity of the counterbalance valve 122. In examples, a lower pressure setting may enhance stability of the counterbalance valve 122. Also, in examples, a lower pilot ratio may enhance stability of the counterbalance valve 122. Similarly, in examples, a lower capacity (smaller flow rate through the counterbalance valve 122) for a give pilot ratio may enhance stability of the counterbalance valve 122.

Further, stability of the counterbalance valve 122 may be based on whether the pilot pressure fluid signal received through the pilot line 126 and the induced pressure of fluid received from the chamber 116 act on the same movable element or act on different respective movable elements within the counterbalance valve 122. In examples, configuring the counterbalance valve 122 such that the pilot pressure fluid signal acts on a movable element different from the movable element on which the induced pressure from the chamber 116 acts may enhance stability of the counterbalance valve 122.

Disclosed herein are counterbalance and relief valves that are configured to have an adjustable pressure setting and configured such that the pilot pressure acts on a movable element that is different from a movable element on which the induced pressure acts.

FIG. 2 illustrates a cross sectional view of a valve 200 in a closed position, in accordance with an example implementation. The valve 200 may be inserted or screwed into a manifold having ports corresponding to ports of the valve 200 described below, and may thus fluidly coupled the valve 200 to other components of a hydraulic system.

The valve 200 may include a main stage 202, a pilot stage 204, and a solenoid actuation mechanism 206. The valve 200 includes a housing 208 that defines a longitudinal cylindrical cavity therein. The longitudinal cylindrical cavity of the housing 208 is configured to house portions of the main stage 202, the pilot stage 204, and the solenoid actuation mechanism 206.

The main stage 202 includes a main sleeve 210 received at a distal or first end of the housing 208, and the main sleeve 210 is coaxial with the housing 208. The main sleeve 210 defines a first port 212 and a second port 214. The first port 212 is defined at a nose of the main sleeve 210 and can be referred to as a load port, for example. The second port 214 may include a first set of cross holes such as cross holes 215A, 215B disposed in a radial array about an exterior surface of the main sleeve 210. The second port 214 may also include a second set of cross holes such as cross holes 215C, 215D disposed in a radial array about the exterior surface of the main sleeve 210. In examples, the second port 214 could be referred to as a tank port or exhaust port.

The main sleeve 210 defines a respective longitudinal cylindrical cavity therein. A reverse flow piston 216 is disposed, and slidably accommodated, within the cavity of the main sleeve 210. The reverse flow piston 216 is coaxial with the housing 208 and the main sleeve 210.

A ring-shaped stopper 218 is fixedly disposed at a distal end (nose) of the main sleeve 210, and the ring-shaped stopper 218 has a shoulder formed on an interior peripheral surface of the ring-shaped stopper 218, where the shoulder is configured to support a distal end of a reverse flow check spring 220. A proximal end of the reverse flow check spring 220 acts against a shoulder formed as a rim or protrusion projecting from the reverse flow piston 216. With this configuration, the distal end of the reverse flow check spring 220 is fixed, whereas the proximal end of the reverse flow check spring 220 is free and interfaces with the reverse flow piston 216. Thus, the reverse flow check spring 220 biases the reverse flow piston 216 in a proximal direction (e.g., to the left in FIG. 2).

An interior peripheral surface of the reverse flow piston 216 at a proximal end thereof tapers outward to form a seat 222 for a main piston 224. The main piston 224 is disposed, and slidably accommodated, in the cavity of the main sleeve 210. The main piston 224 is thus longitudinally adjacent to the reverse flow piston 216 in the cavity of the main sleeve 210. In the closed position shown in FIG. 1A, the main piston 224 is seated on the seat 222. The main piston 224 defines a longitudinal cavity therein.

A pilot seat member 226, which may be ring-shaped, is fixedly disposed at the proximal end of in the main sleeve 210 within the cavity of the housing 208. As shown in FIG. 2, the pilot seat member 226 has a shoulder formed by an exterior peripheral surface of the pilot seat member 226 and interfaces with the proximal end of the main sleeve 210.

A main spring 228 is disposed in the cavity of the main sleeve 210 (and partially in the cavity of the main piston 224 and a cavity of the pilot seat member 226) between the main piston 224 and the pilot seat member 226. The pilot seat member 226 is fixed, and thus the main spring 228 biases the main piston 224 in a distal direction (to the right in FIG. 2). The distal direction could also be referred to as a closing direction. The main spring 228 is configured as a stiff spring that could comprise a single spring or a nested spring. When the valve 200 is in the closed position shown in FIG. 2, a distance 229 separates the main piston 224 from the pilot seat member 226.

The main piston 224 defines therein a main orifice 230 that fluidly couples the first port 212 to a main chamber 232 formed within the main sleeve 210 (and partially in the cavity of the main piston 224 and a cavity of the pilot seat member 226) between the main piston 224 and the pilot seat member 226. The main spring 228 is disposed in the main chamber 232.

Further, the pilot seat member 226 defines a damping orifice 234. The damping orifice 234 is formed as a channel bounded by an interior peripheral surface of the pilot seat member 226. The damping orifice 234 has a first diameter at a distal end of the damping orifice 234 that is fluidly coupled to the main chamber 232, and the damping orifice 234 then enlarges to a second diameter at a proximal end of the damping orifice 234 to form a pilot seat 236 for a pilot poppet 238.

The pilot seat member 226 separates the main stage 202 from the pilot stage 204. The pilot stage 204 includes a pilot sleeve 240 disposed in the cavity of the housing 208. The pilot sleeve 240 defines therein a longitudinal cavity in which the pilot poppet 238 is slidably accommodated. The pilot poppet 238 is thus guided by an interior peripheral surface of the pilot sleeve 240 when the pilot poppet 238 moves axially in a longitudinal direction.

Also disposed within the longitudinal cavity of the pilot sleeve 240 is a pilot piston 242 that is slidably accommodated within the pilot sleeve 240 and guided by the interior peripheral surface of the pilot sleeve 240. As depicted in FIG. 2, the pilot poppet 238 defines a longitudinal cavity and the pilot piston 242 also defines a respective longitudinal cavity aligned with the longitudinal cavity of the pilot piston 242.

A pilot pin 244 is disposed partially in the longitudinal cavity of the pilot piston 242 and partially within the longitudinal cavity of the pilot piston 242. The pilot pin 244 is coupled to the interior surface of the pilot piston 242, and thus the pilot piston 242 and the pilot pin 244 move together. The pilot pin 244 can contact or rest against the pilot poppet 238, but can also separate from the pilot poppet 238 as the pilot poppet 238 and the pilot pin 244 move relative to each other.

A pilot spring 246 is disposed about an exterior peripheral surface of the pilot pin 244. The pilot spring 246 is configured to float between the pilot poppet 238 and the pilot piston 242, and is configured to bias the pilot poppet 238 to the seated position shown in FIG. 2 where the pilot poppet 238 is seated on the pilot seat 236 defined by the pilot seat member 226.

The housing 208 defines a pilot port 247 on an exterior peripheral surface of the housing 208. A first slanted channel 248A is configured to communicate pilot pressure fluid signal received at the pilot port 247 to a groove defined on the exterior peripheral surface of the pilot sleeve 240. A second slanted channel 248B then communicates the pilot pressure fluid signal to an annular chamber 249 formed between an interior peripheral surface of the pilot sleeve 240 and an exterior peripheral surface of the pilot piston 242.

The solenoid actuation mechanism 206 includes a solenoid tube 250 disposed within and received at a proximal end of the housing 208, such that the solenoid tube 250 is coaxial with the housing 208. A solenoid coil 251 is disposed about an exterior surface of the solenoid tube 250.

The solenoid tube 250 is configured to house plug 252 and a plunger or armature 253. In examples, the plug 252 may be formed as an integral part of the solenoid tube 250. The plug 252 and the armature 253 define therein a longitudinal channel through which a solenoid pin 254 is slidably disposed. A distal end of the solenoid pin 254 interfaces with and contacts a proximal end of the pilot piston 242 as shown in FIG. 2. Thus, the pilot piston 242 and the solenoid pin 254 move together longitudinally. For instance, if the pilot piston 242 moves in the proximal direction, the pilot piston 242 pushes the solenoid pin 254 in the proximal direction. The proximal direction could also be referred to as an opening direction.

Further, the solenoid tube 250 includes a pole piece 256 separated from the armature 253 by an airgap 258. The pole piece 256 may be composed of material of high magnetic permeability.

A solenoid spring 260 is disposed in a longitudinal cavity defined within the pole piece 256. A distal end of the solenoid spring 260 interfaces or interacts with both a proximal end of the armature 253 and a proximal end of the solenoid pin 254. A proximal end of the solenoid spring 260 interfaces with a set screw 262. The set screw 262 is configured to set a length of the solenoid spring 260, and thus sets a biasing force that the solenoid spring 260 applies in the distal direction on the solenoid pin 254.

Specifically, based on a spring rate of the solenoid spring 260 and the length of the solenoid spring 260, the solenoid spring 260 exerts a preload or biasing force on the solenoid pin 254 in the distal direction. The biasing force is transferred to the pilot piston 242, which then transfers the biasing force to the pilot poppet 238 via the pilot pin 244 and the pilot spring 246, thus causing the pilot poppet 238 to be seated at the pilot seat 236 of the pilot seat member 226.

The biasing force determines the pressure setting of the valve 200. Particularly, the pressure setting of the valve 200 can be determined by dividing the biasing force that the solenoid spring 260 applies to the pilot poppet 238 (via the solenoid pin 254, the pilot piston 242, and the pilot spring 246) by the effective area of the pilot seat 236. The effective area of the pilot seat 236 can be estimated as a circular area having a diameter of the pilot seat 230. Thus, the solenoid spring 260 can be referred to as the setting spring.

The valve 200 is configured to operate in different modes of operation. For example, the valve 200 may be used as a counterbalance valve, such as the counterbalance valve 122. In this example, the valve 200 may be installed in the hydraulic circuit 100 such that the first port 212 of the valve 200 is fluidly coupled to the chamber 116. The second port 214 is fluidly coupled to the directional control valve 102, and the pilot port 247 coupled to the pilot line 126. As such, the valve 200 is configured to allow free flow from the second port 214 to the first port 212 to perform the operation of the free-flow check valve 132 described above with respect to FIG. 1.

FIG. 3 illustrates operation of the valve 200 to allow free flow from the second port 214 to the first port 212, in accordance with an example implementation. In this mode of operation, pressurized fluid is received at the second port 214 from the directional control valve 102, and the valve 200 allows fluid to flow freely from the second port 214 to the first port 212.

Referring back to FIG. 2, fluid received at the second port 214 flows through the cross holes 215A, 215B to an annular space 264 between the interior peripheral surface of the main sleeve 210 and the exterior peripheral surface of the reverse flow piston 216. The pressurized fluid then applies a force on a ring-shaped end face 266 (referenced in FIG. 3) of the reverse flow piston 216, thereby pushing the reverse flow piston 216 in the distal direction against the reverse flow check spring 220. FIG. 3 depicts the reverse flow piston 216 moved in the distal direction (to the right in FIG. 3) relative to its position in FIG. 2.

As a result, the pressurized fluid received at the second port 214 flows freely (e.g., without sending a signal to the solenoid coil 251) through the cross holes 215A, 215B, through an inner chamber or cavity of the reverse flow piston 216 to the first port 212. From the first port 212, the pressurized fluid flows to the chamber 116.

As depicted in FIG. 3, a step or shoulder 268 is formed on the interior peripheral surface of the main sleeve 210. A corresponding step of shoulder 269 is formed on the exterior peripheral surface of the main piston 224 at the proximal end thereof. The shoulder 269 of the main piston 224 interacts with the shoulder 268 of the main sleeve 210 to prevent the main piston 224 from following the reverse flow piston 216 when the reverse flow piston 216 moves in the distal direction.

As mentioned above with respect to FIG. 1, when the load 114 acts with gravity (e.g., overrunning load) the counterbalance valve 122 facilitates lowering the load 114 controllably by restricting flow of fluid forced out of the chamber 116. Particularly, the counterbalance valve 122 receives a pilot pressure fluid signal from the pilot line 126 that acts along with the fluid received from the chamber 116 to open the counterbalance valve 122. The counterbalance valve 122 prevents fluid flow from the chamber 116 through the counterbalance valve 122 until the combined force of the pilot pressure fluid signal and the fluid from the chamber 116 overcomes the biasing force of the setting spring 130. The amount of flow allowed through the counterbalance valve 122 is based on the pressure level of the pilot pressure fluid signal in the pilot line 126, such that a higher pilot pressure fluid signal causes the counterbalance valve 122 to allow a large amount of flow. This mode of operation can be referred to as pilot modulation mode of operation.

The valve 200 is configured to operate in the pilot modulation mode of operation as well. Particularly, when a pilot pressure fluid signal received at the pilot port 247 along with the fluid received at the port 212 overcome the pressure setting of the valve 200, the valve 200 opens and fluid is allowed from the first port 212 to the second port 214.

FIG. 4 illustrates a cross-sectional view of the valve 200 in pilot modulation mode of operation, in accordance with an example implementation. In the pilot modulation mode of operation, the fluid received at the first port 212 may have a particular pressure level that is lower than the pressure setting of the valve 200 determined by the solenoid spring 260. Thus, pressure level of the fluid in the main chamber 232, which is received from the first port 212 through the main orifice 230, is not sufficient to push the pilot poppet 238 off the pilot seat 236. However, a pilot pressure fluid signal is received at the pilot port 247, and the pilot pressure fluid signal is communicated through the slanted channels 248A and 248B to the chamber 249 to exert a force on the pilot piston 242 in the proximal direction.

FIG. 5 illustrates a zoomed-in view of the cross section view of FIG. 4, in accordance with an example implementation. As shown in FIG. 5, the pilot piston 242 has a groove 280 on the exterior peripheral surface of the pilot piston 242. The groove 280 is bounded by a first annular surface area "$A_1$" and a second annular surface area "$A_2$" labelled in FIG. 5. The pilot pressure fluid signal pressurized fluid communicated to the chamber 249 applies respective forces on the annular surfaces areas "$A_1$" and "$A_2$." The annular surface area "$A_1$" is slightly larger than the annular surface area "$A_2$," and as a result, the pilot pressure fluid signal applies a net force on the pilot piston 242 in the proximal direction (e.g., to the left in FIGS. 4-5). The net force can be determined, for example, by multiplying a pressure level of the pilot pressure fluid signal by the area difference $A_2$ minus $A_1$.

The net force applied on the pilot piston 242 causes the pilot piston 242 to be pushed axially in the proximal direction within the pilot sleeve 240. As a result, the pilot spring 246 is decompressed or is extended and the spring force that the pilot spring 246 applies to the pilot poppet 238 is reduced. Thus, the biasing force that the solenoid spring 260 exerts on the pilot poppet 238 via the pilot spring 246 is reduced. Effectively, the pressure setting of the valve 200 is reduced as a result of the action of the pilot pressure fluid signal on the pilot piston 242.

Further, as the pilot piston 242 moves in the proximal direction, the pilot pin 244, which is coupled to the pilot piston 242, moves along with the pilot piston 242. As a result, the pilot pin 244 is separated from the pilot poppet 238 as illustrated by a gap depicted therebetween in FIG. 5. As such, the force applied to the pilot poppet 238 via the pilot pin 244 is removed or reduced.

In this state, the forces that act on the pilot poppet 238 are as follows: a force applied by pressurized fluid in the main chamber 232 acting on an effective area of the pilot seat 236 and a force applied by the pilot spring 246 on the pilot poppet 238. The effective area of the pilot seat 236 can be estimated as a circular area having a diameter of the pilot seat 236. The diameter of the pilot seat 236 could be slightly large than a diameter "$d_1$" of the damping orifice 234 shown in FIG. 5.

The force applied by the pilot spring 246 is reduced due to action of the pilot pressure fluid signal received at the pilot port 247 as described above. When the pilot pressure fluid signal reaches a particular pressure level determined by the pilot ratio of the valve 200, the force of the pilot spring 246 is reduced to a predetermined force value to allow the force of fluid from the main chamber 232 to unseat the pilot poppet 238 as shown in FIG. 5.

As a result, fluid is allowed to flow through the damping orifice 234 to a chamber 282 formed between an exterior peripheral surface of the pilot poppet 238 and the interior peripheral surface of the pilot seat member 226. Fluid in the chamber 282 then flows through cross holes(s) 284 in the pilot seat member 226 to an annular space 286 formed between the exterior peripheral surface of the main sleeve 210 and the interior peripheral surface of the housing 208. Several cross holes 284 could be disposed in a radial array about the pilot seat member 226. From the annular space 286, fluid is communicated to slanted channel 288 formed in the housing 208, and then fluid flows through the slanted channel 288 to the second port 214. The fluid flow through the slanted channel 288 to the second port 214 can be referred to as the pilot flow.

The pilot flow from the first port 212 to the second port 214 allows for a pressure drop across the main orifice 230. Thus, the pressure level of fluid in the main chamber 232 becomes lower that the pressure level of fluid received at the first port 212. Thus, the fluid at the first port 212 applies a force on the main piston 224 in the proximal direction that is large than the force applied by fluid in the main chamber 232 on the main piston 224 in the distal direction.

Due to such force imbalance on the main piston 224, the main piston 224 moves axially in the proximal direction. The main piston 224 may travel past edges of the cross holes 215C, 215D, thus exposing the cross holes 215C, 215D and the second port 214. Fluid received at the first port 212 is thus allowed to flow through the inner chamber of the reverse flow piston 216, through the cross holes 215C, 215D directly to the second port 214, and the valve 200 is in an open state.

The extent of motion of the main piston 224 is depicted in FIG. 5 by comparing the distance 229 shown in FIG. 2 to corresponding distance in FIG. 5. As depicted in FIG. 5, a step or shoulder 270 is formed on the interior peripheral surface of the main sleeve 210. The ring-shaped end face 266 of the reverse flow piston 216 interacts with the shoulder 270 of the main sleeve 210 to prevent the reverse flow piston 216 from following the main piston 224 when the main piston 224 moves in the proximal direction.

The configuration of the valve 200 renders the valve 200 more stable than other valve configurations. As mentioned above, one of the factors that affect stability of a counterbalance valve is the pilot ratio. The pilot ratio determines how the pressure setting of the valve 200 changes as the pilot pressure (i.e., the pressure level of the pilot pressure fluid signal at the port 247) changes. As an example, a 3:1 pilot ratio indicates that an increase of, for example, 10 bar in the pilot pressure decreases the pressure setting by 30 bar.

In example counterbalance valves, the pilot ratio ($P_R$) is determined as the ratio of two areas:

$$P_R = \frac{A_P}{A_L},$$

where $A_P$ is the affective surface area that the pilot pressure fluid signal received at a pilot acts on, and $A_L$ is the effective area that the load pressure received at an inlet port acts on. With the configuration of the valve 200 disclosed herein, however, the pilot ratio is further based on a spring rate of the pilot spring 246 and a spring rate of the solenoid spring 260. Assuming that the spring rate of the pilot spring 246 is $SR_{PS}$ and the spring rate of the solenoid spring 260 is $SR_{SS}$, then the pilot ratio $P_R$ of the valve 200 can be estimate by the following equation:

$$P_R = \frac{A_P}{A_M} \frac{SR_{PS}}{(SR_{SS} + SR_{PS})} \qquad (1)$$

where in this case $A_P$ is the effective surface area that the pilot pressure fluid signal acts on (i.e., $A_1$ minus $A_2$ as described above with respect to FIG. 5) and $A_L$ is the effective area of the pilot seat 236 (i.e., a circular area having a diameter of the pilot seat 236) on which the pressurized fluid (i.e., the load pressure) at the first port 212 acts.

As indicated by equation 1, the pilot spring 246 can be selected to have a $SR_{PS}$ that lowers $P_R$. A lower $P_R$ enhances stability of the valve 200. Further, a low $P_R$ may enhance resolution and proportionality of the valve 200. As such, a change in the pilot pressure at the pilot port 247 causes a proportional change in axial position of the pilot poppet 238, which causes a proportional change in the axial position of the main piston 224, and thus a proportional change in amount of flow through the valve 200 from the first port 212 to the second port 214.

Further, as the pilot poppet 238 moves axially in the proximal direction, the pilot pin 244 acts as a stopper for the pilot poppet 238 that precludes the pilot poppet 238 from moving further. In other words, the pilot pin 244 limits the stroke of the pilot pin 244. This stroke limitation of the pilot poppet 238 may further enhance the stability of the valve 200 relative to other counterbalance valves.

Further, while the pressurized fluid received at the first port 212 acts on the main piston 224, the pilot pressure fluid signal received at the pilot port 247 acts on the pilot piston 242, which is independent and decoupled from the main piston 224. With this configuration, where the pilot pressure fluid signal at the pilot port 247 acts on a movable element (the pilot piston 242) different from the movable element (the main piston 224) on which the pressurized fluid at the first port 212 acts may enhance stability of the valve 200 relative to other counterbalance valves.

Further, in addition to adjusting the pressure setting of the valve 200 via the pilot pressure fluid sign, the valve 200 is beneficially characterized in that the pressure setting of the valve 200 can further be adjusted based on a signal provided to the solenoid coil 251. FIG. 6 illustrates adjusting the pressure setting of the valve 200 via the solenoid actuation mechanism 206, in accordance with an example implementation.

When an electric current is provided through the windings of the solenoid coil 251, a magnetic field is generated. The pole piece 256 directs the magnetic field through the airgap 258 toward the armature 253, which is movable and is attracted toward the pole piece 256. In other words, when an electric current is applied to the solenoid coil 251, the generated magnetic field forms a north and south pole in the pole piece 256 and the armature 253, and therefore the pole piece 256 and the armature 253 are attracted to each other. Because the pole piece 256 is fixed and the armature 253 is movable, the armature 253 traverses the airgap 258 toward the pole piece 256. As a result, the armature 253 applies a force on and compresses the solenoid spring 260 in the proximal direction.

Thus, when the solenoid coil 251 is energized, three additive forces act against the solenoid spring 260 in the proximal direction. The first force is the force that the armature 253 applies on the solenoid spring 260. As the armature 253 applies a force on the solenoid spring 260 in the proximal direction, the force that the solenoid spring 260 applies on the solenoid pin 254 in the distal direction is reduced. As a result, the force that the solenoid pin 254 applies to the pilot piston 242 in the distal direction, and in turn the force that pilot piston 242 applies to the pilot poppet 238 via the pilot spring 246 in the distal direction is also reduced. As such, the pressure setting of the valve 200 is reduced, and thus the force applied to the pilot poppet 238 that the pressurized fluid received at the first port 212 overcomes to open the valve 200 is reduced.

The second force is the force applied via the pilot pressure fluid signal via the pilot piston 242 and the solenoid pin 254 on the solenoid spring 260. As described above with respect to FIGS. 4-5, this second force applied by the pilot pressure signal to the pilot piston 242 reduces the pressure setting of the valve 200. The third force is the force that the pressurized fluid received at the first port 212 applies on the pilot poppet 238 through the damping orifice 234. This third force applied on the pilot poppet 238 is transferred to the solenoid spring 260 via the pilot spring 246, the pilot piston 242, and the solenoid pin 254.

With this configuration, the first and second forces from the armature 253 and the pilot pressure fluid signal, respectively, assist the pressurized fluid at the first port 212 to overcome the force applied to the pilot poppet 238 in the distal direction by the solenoid spring 260 (via the solenoid pin 254, the pilot piston 242, and the pilot spring 246). In other words, the force applied to the pilot poppet 238 in the closing direction is reduced to a predetermined force value that is based on the pressure level of the pilot pressure fluid signal and the magnitude of the electric current (e.g., magnitude of the signal) provided to the solenoid coil 251. As such, the force resulting from sending a signal to the solenoid coil 251 and the force resulting from the pilot pressure fluid signal received at the pilot port 247 reduce the pressure setting of the valve 200, and thus a reduced pressure level at the first port 212 causes the valve 200 to open.

As mentioned above with respect to FIGS. 4-5, the forces that act on the pilot poppet 238 are as follows: a force applied by pressurized fluid in the main chamber 232 acting on the effective area of the pilot seat 236 and a force applied by the pilot spring 246 on the pilot poppet 238. The force applied by the pilot spring 246 on the pilot poppet 238 is reduced by the armature 253 as well as the pilot pressure fluid signal received at the pilot port 247 as described above. The reduction in the force of the pilot spring 246 allows fluid in the main chamber 232 (received through the first port 212) to unseat the pilot poppet 238 as shown in FIG. 6 despite the fluid at the first port 212 having a pressure level lower than the pressure setting of the valve 200.

As the pilot poppet 238 is unseated, pilot flow is generated from the first port 212, through the main orifice 230 and the main chamber 232, through the damping orifice 234 to the chamber 282, through the cross holes(s) 284 to the annular space 286, and through the slanted channel 288 to the second port 214. The pilot flow from the first port 212 to the second port 214 allows for a pressure drop across the main orifice 230. Thus, the pressure level of fluid in the main chamber 232 is lower that the pressure level of fluid received at the first port 212.

Due to the force imbalance on the main piston 224, the main piston 224 moves axially in the proximal direction. When the main piston 224 travels past edges of the cross holes 215C, 215D, main flow is generated from the first port 212 through the inner chamber of the reverse flow piston 216, through the cross holes 215C, 215D to the second port 214.

The valve 200 could operate in other modes of operation. For instance, in addition to being configured as a counterbalance valve, the valve 200 could be configured as a pressure relief valve.

FIG. 7 illustrates a zoomed-in view of a cross section of the valve 200 in a pressure relief mode, in accordance with an example implementation. In the pressure relief mode, the valve 200 could be used to control or limit pressure level in a hydraulic system. The valve 200 is configured to open when pressure level of fluid in the main chamber 232 reaches a predetermined set pressure determined by the solenoid spring 260. The predetermined set pressure is determined by dividing a preload force that the solenoid spring 260 applies to the pilot poppet 238 (via the solenoid pin 254, the pilot piston 242, and the pilot spring 246) divided by the effective area of the pilot seat 236 (i.e., the circular area having the diameter of the pilot seat 236, which could be slightly larger than the diameter "$d_1$" of the damping orifice 234).

In examples, pressure level in the main chamber 232 may be equal to or slightly less than the pressure level of fluid received at the first port 212. Once the pressure level in the main chamber 232 exceeds the predetermined set pressure, the fluid in the main chamber 232 pushes the pilot poppet 238 in the proximal direction (to the left in FIG. 7) off the pilot seat 236 as shown in FIG. 7. The pilot poppet 238 then pushes the pilot pin 244 in the proximal direction, thus pushing the pilot piston 242 in the proximal direction as well. In this pressure relief mode, as shown in FIG. 7, the pilot pin 244 remains in contact with the pilot poppet 238 when the pilot poppet 238 is unseated. In contrast, in FIG.

5 illustrating the pilot modulation mode, the pilot pin 244 has separated from the pilot poppet 238.

As a result of the pilot poppet 238 being unseated, a pilot flow is generated from the first port 212 through the main orifice 230, the main chamber 232, the damping orifice 234, the chamber 282, the cross hole(s) 284, the annular space 286, and the slanted channel 288 to the second port 214. The pilot flow causes a pressure drop across the main orifice 230, thereby causing the main piston 224 to be subjected to a force imbalance and to move in the proximal direction against the main spring 228. Axial movement of the main piston 224 past the edges of the cross holes 215C, 215D allows main flow from the first port 212 through the inner chamber of the reverse flow piston 216 through the cross holes 215C, 215D to the second port 214. As such, pressurized fluid at the first port 212 is relieved to the second port 214.

Beneficially, the predetermined set pressure of the valve 200 operating in the pressure relief mode can be adjusted by sending a signal to the solenoid coil 251. As described above, providing an electric current to the solenoid coil 251 by an electronic controller of a hydraulic system results in the armature 253 applying a force to the solenoid spring 260, thereby reducing the preload force that the solenoid spring 260 applies to the solenoid pin 254. Thus, the pressure setting can be adjusted by varying the electric current to the solenoid coil 251 to allow different levels of pressures at the first port 212 as desired to overcome the preload force of the solenoid spring 260 and open the valve 200.

The configurations and components shown in FIGS. 2-7 are examples for illustration, and different configurations and components could be used. For example, components can be integrated into a single component or a component can be divided into multiple components. As another example, different types of springs could be used, and other components could be replaced by components that perform a similar functionality.

Figure 8:
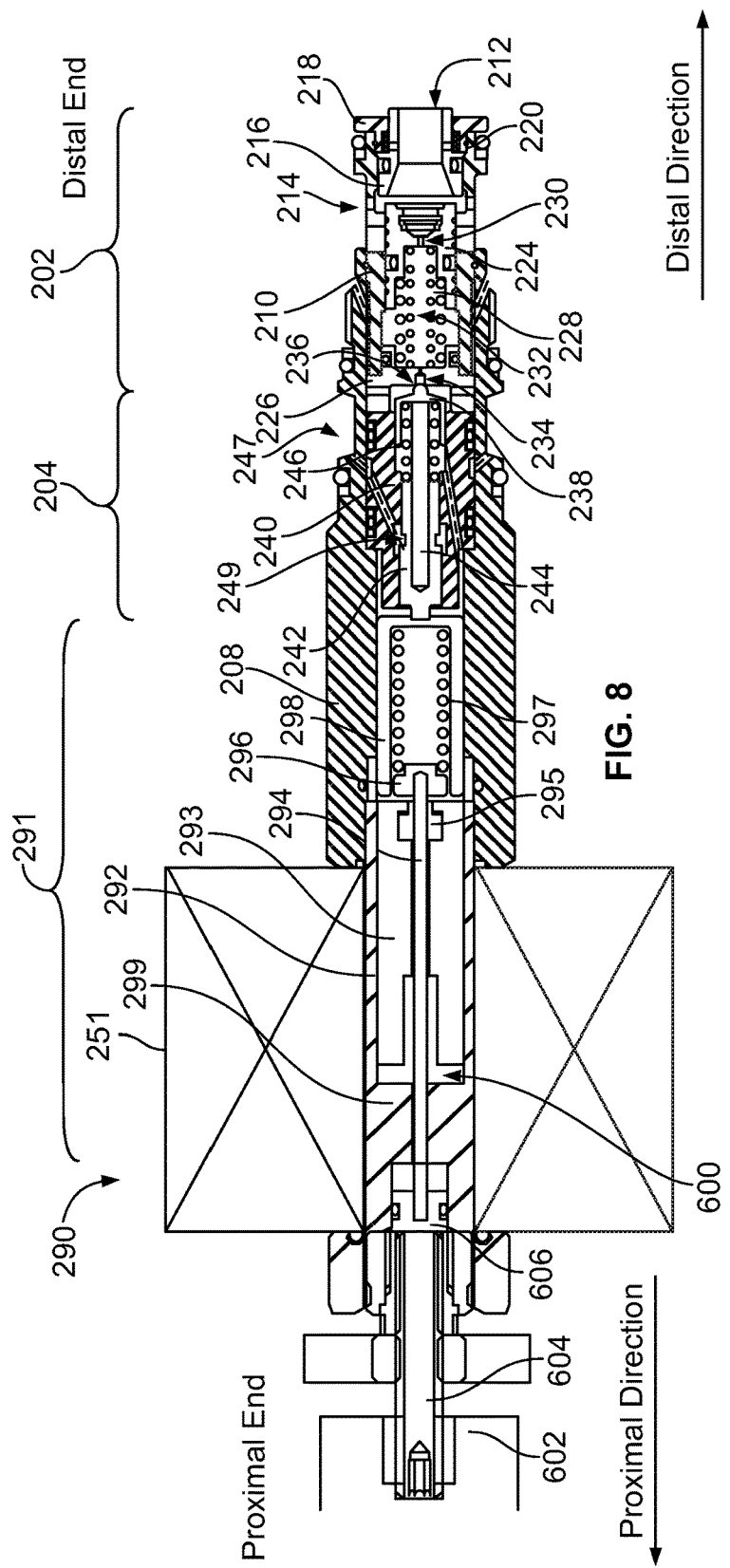
FIG. 8 illustrates a cross-sectional view of a valve having a pull-type solenoid actuation mechanism, in accordance with an example implementation.

As another example, while the valve 200 includes the solenoid actuation mechanism 206 configured as an inverted push-type solenoid actuation mechanism, the valve 200 could be configured differently to use a pull-type solenoid actuation mechanism. FIG. 8 illustrates a cross sectional view of a valve 290 having a pull-type solenoid actuation mechanism 291, in accordance with an example implementation. The solenoid actuation mechanism 291 includes a solenoid tube 292 disposed within and received at the proximal end of the housing 208, such that the solenoid tube 292 is coaxial with the housing 208. The solenoid coil 251 is disposed about an exterior surface of the solenoid tube 292 similar to the solenoid tube 251 being disposed about the exterior surface of the solenoid tube 250 in the valve 200.

The solenoid tube 292 is configured to house an armature 293. The armature 293 defines therein a longitudinal channel through which a solenoid pin 294 is slidably disposed. The armature 293 includes a recessed area on an interior peripheral surface of the armature 293, and the solenoid pin 294 has an enlarged portion 295 disposed in the recessed area of the interior peripheral surface of the armature 293. With this configuration, if the armature 293 moves axially in the proximal direction, the armature 293 engages the enlarged portion 295 of the solenoid pin 294, thus causing the solenoid pin 294 to move axially along with the armature 293.

A distal end of the solenoid pin 294 is coupled to a spring cap 296 disposed against and supporting a proximal end of a solenoid spring 297. The distal end of the solenoid spring 297 rests against a spring-loaded piston 298, which is coupled to the proximal end of the pilot piston 242. The pilot piston 242 is configured slightly different in the valve 290 compared to the valve 200 to accommodate the differences in the configuration of the solenoid actuation mechanism.

The armature 293 is coupled to the spring loaded piston 298. As such, if the armature 293 moves axially in the proximal direction, the spring-loaded piston 298 moves along with the armature 293 in the proximal direction Further, the solenoid tube 292 includes the pole piece 299 separated from the armature 293 by an airgap 600. The pole piece 299 may be composed of material of high magnetic permeability.

Based on a spring rate of the solenoid spring 297 and the length of the solenoid spring 297, the solenoid spring 297 exerts a preload or biasing force on the pilot piston 242 via the spring-loaded piston 298 in the distal direction. The biasing force is transferred to the pilot poppet 238 via the pilot pin 244 and the pilot spring 246, thus causing the pilot poppet 238 to be seated at the pilot seat 236 of the pilot seat member 226.

The biasing force of the solenoid spring 297 determines the pressure setting of the valve 290. Particularly, the pressure setting of the valve 290 can be determined by dividing the biasing force that the solenoid spring 297 applies to the pilot poppet 238 (via the spring-loaded piston 298, the pilot piston 242, and the pilot spring 246) by the effective area of the pilot seat 236.

When an electric current is provided through the windings of the solenoid coil 251, a magnetic field is generated. The pole piece 299 directs the magnetic field through the airgap 600 toward the armature 293, which is movable and is attracted toward the pole piece 299. Because the pole piece 299 is fixed and the armature 293 is movable, the armature 293 is pulled in the proximal direction and traverses the airgap 600 toward the pole piece 299.

As the armature 293 is pulled in the proximal direction, the armature 293 engages the enlarged portion 295 of the solenoid pin 294 and pulls the solenoid pin 294 in the proximal direction as well. The solenoid pin 294 in turn causes the spring cap 296 to move in the proximal direction. Additionally, as the armature 293 is pulled in the proximal direction, the armature 293 causes the spring-loaded piston 298 coupled thereto to move in the proximal direction as well. As a result, the biasing fore that the solenoid spring 297 applies to the pilot piston 242 via the spring-loaded piston 298 in the distal direction is reduced. For example, the biasing force acting on the pilot piston 242 can be determined as the spring force of the solenoid spring 297 minus the solenoid force applied by the armature 293 on the spring-loaded piston 298 in the proximal direction.

As a result of the reduction in the force applied to the pilot piston 242, the force that pilot piston 242 applies to the pilot poppet 238 via the pilot spring 246 in the distal direction is also reduced. As such, the pressure setting of the valve 290 is reduced, and thus the force applied to the pilot poppet 238 that the pressurized fluid received at the first port 212 overcomes to open the valve 290 is reduced.

With this configuration, the pulling force of the armature 293 in the proximal direction and the force that and the pilot pressure fluid signal applies to the pilot piston 242, respectively, assist the pressurized fluid at the first port 212 to overcome the force applied to the pilot poppet 238 in the distal direction by the solenoid spring 297 (via the spring-loaded piston 298, the pilot piston 242, and the pilot spring 246). In other words, the force applied to the pilot poppet 238 in the closing direction is reduced to a predetermined force value that is based on: (i) the pressure level of the pilot pressure fluid signal, and (ii) the solenoid force that is based on the magnitude of the electric current (e.g., magnitude of the signal) provided to the solenoid coil 251. As such, the pulling force (i.e., the solenoid force) resulting from sending a signal to the solenoid coil 251 and the force resulting from the pilot pressure fluid signal received at the pilot port 247 reduce the pressure setting of the valve 290, and thus a reduced pressure level at the first port 212 causes the valve 290 to open.

In the configuration of the valve 200, the armature 253 applies a force in the proximal direction on the solenoid spring 260, thus compressing the solenoid spring 260 so that the biasing force that the solenoid spring 260 applies to the pilot poppet 238 in the distal direction is reduced. Similarly, with the configuration of the valve 290, the armature 293 also applies a force in the proximal direction on the solenoid spring 297, thus causing the biasing force that the solenoid spring 297 applies to the pilot poppet 238 in the distal direction to be reduced. Thus, in either valve configuration of the valves 200 or 300, as the armature 253, 293 moves, the armature 253, 293 applies a force on the solenoid spring 260, 297 in the proximal direction that is opposite to the distal direction in which the solenoid spring 260, 297 applies the biasing force on the pilot poppet 238. As a result, the biasing force applied to the pilot poppet 238 is reduced, and the pressure setting of the valve 200, 290 is decreased.

In examples, the valves 200, 290 could include a mechanism for mechanically or manually adjusting the maximum pressure setting of the valve 200, 290. For example, the valve 290 depicted in FIG. 8 may include a handle or knob 602. The knob 602 is coupled to a screw 604, and the screw 604 interfaces with a plunger 606 that is coupled to the solenoid pin 254. If the knob 602 is rotated in a first direction (e.g., in a clockwise direction), the screw 604 may move axially in the distal direction (e.g., to the right in FIG. 8) pushing the plunger 606 and the solenoid pin 294 in the distal direction. The solenoid pin 294 in turn pushes the spring cap 296 in the distal direction, thus compressing the solenoid spring 297 and increasing the preload or biasing force of the solenoid spring 297.

Conversely, rotating the knob 602 in a second direction (e.g., counter-clockwise) causes the screw 604 to move axially in the proximal direction, allowing the solenoid spring 297 to push the spring cap 296, the solenoid pin 294, and the plunger 606 in the proximal direction. The length of the solenoid spring 297 thus increases and the preload or biasing force of the solenoid spring 297 is reduced. With this configuration, the biasing force of the solenoid spring 297, and thus the maximum pressure setting of the valve 290, can be adjusted via the knob 602. A similar mechanical adjustment mechanism could be added to the valve 200 as well.

Figure 9:
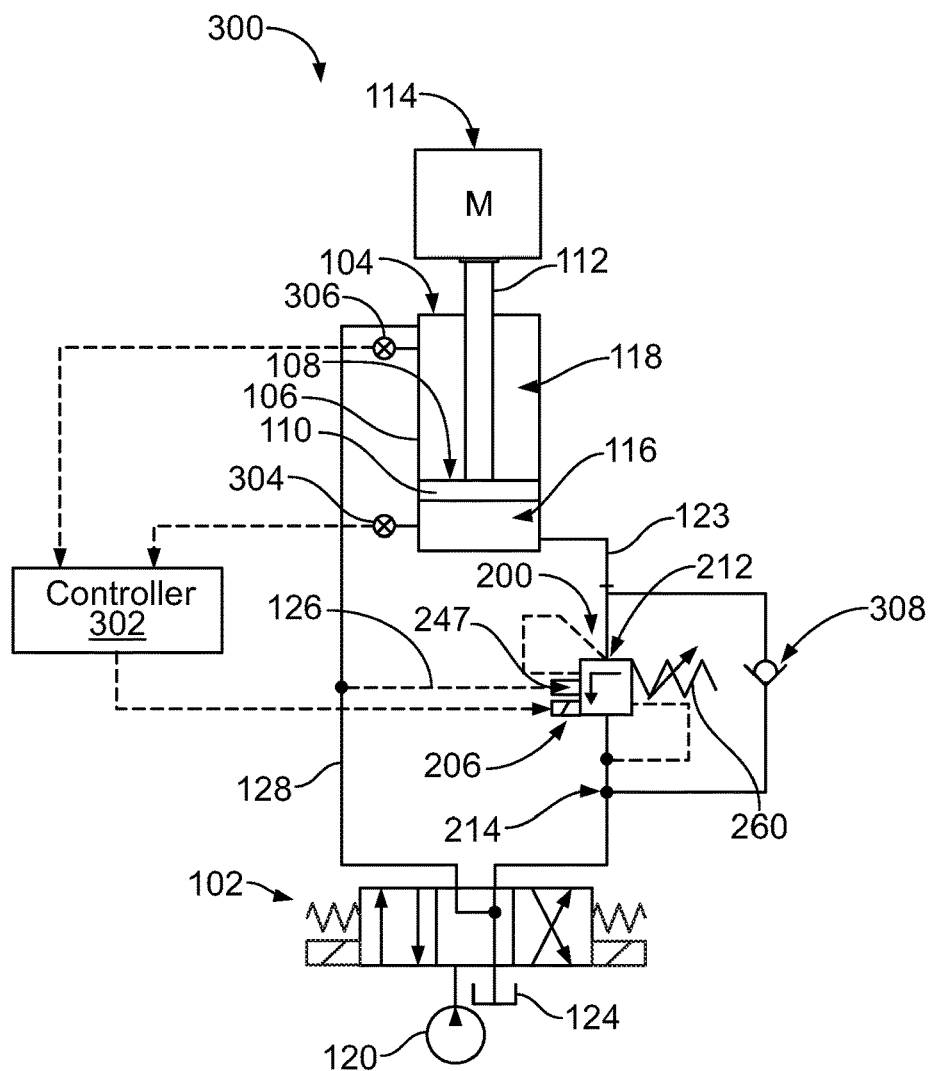
FIG. 9 illustrates a hydraulic circuit using the valve of FIG. 2 or the valve of FIG. 8, in accordance with an example implementation.

FIG. 9 illustrates a hydraulic circuit 300 using the valve 200 or the valve 290, in accordance with an example implementation. Similar components between the hydraulic circuit 300 and the hydraulic circuit 100 are designated with the same reference numbers. As shown in FIG. 9, the valve 200, 290 replaces the counterbalance valve 122. The first port 212 of the valve 200, 290 is fluidly coupled to the chamber 116 and the second port 214 is fluidly coupled to the directional control valve 102. The pilot port 247 is fluidly coupled via the pilot line 126 to the hydraulic line 128 that fluidly couples the directional control valve 102 to the chamber 118.

The hydraulic circuit 300 includes a controller 302 that could comprise any type of computing device configured to control operation of the hydraulic circuit 300 or a hydraulic system that includes the hydraulic circuit 300. The controller 302 may include one or more processors or microprocessors and may include data storage (e.g., memory, transitory computer-readable medium, non-transitory computer-readable medium, etc.). The data storage may have stored thereon instructions that, when executed by the one or more processors of the controller 302, cause the controller 302 to perform the operations described herein.

The hydraulic circuit 300 may include one or more pressure sensors such as pressure sensor 304 configured to measure pressure level in the chamber 116 and pressure sensor 306 configured to measure pressure level in the chamber 118. The pressure sensors 304, 306 are in communication with the controller 302 and provide to the controller 302 information indicative of the pressure levels respectively measured by the pressure sensors 304, 306. The controller 302 may then determine the load 114 based on the pressure levels in the chambers 116, 118 and the surface areas of the piston 108 in each chamber.

The hydraulic circuit 300 may additionally or alternatively include a load sensor configured to measure the load 114. Further, in some examples, the hydraulic circuit 300 may include one of the pressure sensors 304, 306, such as the pressure sensor 304 configured to measure the pressure level in the chamber 116. Other types of sensors could be used to indicate the magnitude of the load 114.

In operation, to extend the piston 108, pressurized fluid is provided from the pump 120 through the directional control valve 102 and the free flow check 308 to the chamber 116. The free flow check 308 is a symbolic representation of the reverse free flow operation described above with respect to FIG. 3. Particularly, the reverse flow piston 216 moves distally allowing flow from the second port 214 through the cross holes 215A, 215B and the internal chamber of the reverse flow piston 216 to the first port 212, which is coupled to the chamber 116. As the piston 108 extends, fluid forced out of the chamber 118 flows through the hydraulic line 128 and the directional control valve 102 to the tank 124.

To retract the piston 108, pressurized fluid is provided from the pump 120 through the directional control valve 102 and the hydraulic line 128 to the chamber 118. As the piston 108 retracts, fluid in the chamber 116 is forced out of the chamber 116 through the hydraulic line 123 to the first port 212. Further, a pilot pressure fluid signal is received through the pilot line 126 at the pilot port 247.

The pilot pressure fluid signal received through the pilot line 126 at the pilot port 247 acts on the pilot piston 242 as described above with respect to FIGS. 4-5. The pilot pressure fluid signal, along with the fluid received at the first port 212 act against the solenoid spring 260, 297. Once the combined action of the pilot pressure fluid signal and the fluid at the first port 212 overcome the pressure setting of the valve 200, 290, the valve 200, 290 may open to allow fluid at the first port 212 to flow to the second port 214, then through the directional control valve 102 to the tank 124.

Additionally, the controller 302 may vary, adjust, or modify the pressure setting of the valve 200, 290 by providing a signal to the solenoid actuation mechanism 206, 291 (particularly, to the solenoid coil 251) of the valve 200, 290. As described above with respect to FIGS. 6 and 8, providing an electric signal to the solenoid coil 251 causes the armature 253, 293 to move and apply a force to the solenoid spring 260, 297, thereby reducing the pressure setting of the valve 200, 290.

In this manner, the controller 302 may monitor the load 114 through the information received from the pressure sensors 304, 306 or any other sensors to determine whether the load 114 is acting with gravity and inducing a large pressure in the chamber 116 and the extent or value of the induced pressure in the chamber 116. Accordingly, the controller 302 may send a signal to the solenoid coil 251 to vary the pressure setting of the valve 200, 290.

In examples, the magnitude of the pressure setting may be inversely proportional to the magnitude of the electric signal provided to the solenoid coil 251. As such, if the load 114 is large and acting with gravity, then the controller 302 might not send a signal to the solenoid coil 251 or might send a signal with a small magnitude so as to maintain the pressure setting high and control lowering the load 114. On the other hand, if the load 114 is small or the actuator 104 is titled at an angle such that gravitational force is reduced, the controller 302 may provide an electric signal with a larger magnitude to reduce the pressure setting of the valve 200, 290. This way, the pressure level in the chamber 116 that causes the valve 200, 290 to open may be reduced. As a result, the hydraulic circuit 300 operates more efficiently and energy loss is reduced.

The hydraulic circuit 300 is an example circuit in which the valve 200, 290 could be used; however, the valve 200, 290 could be used in other hydraulic circuits and systems as well. For instance, rather than using a four-way direction control valve that controls flow to both chambers 116, 118, a separate two or three way valve could be used to independently meter fluid into each of the chambers 116, 118. In this case, two valves 200 (or 290) could be used, one valve 200, 290 for each chamber to control flow forced out of each chamber.

Further, in some examples, rather than having fluid exiting the valve 200, 290 at the second port 214 flowing through the directional control valve 102 before being delivered to the tank 124, the valve 200, 290 can be configured as a meter-out element while a two- or three-way directional control valve is configured as a meter-in element. In this configuration, the second port 214 could be fluidly coupled to the tank 124 such that fluid exiting the valve 200, 290 flows to the tank 124 without flowing through a directional control valve.

In some examples, the directional control valves could be electrically operated as well, and in these examples, the controller 3002 may be configured to send signals to the directional control valves to actuate them based on the sensor information received from the pressure sensors 304, 306. Other configurations are possible.

Figure 10:
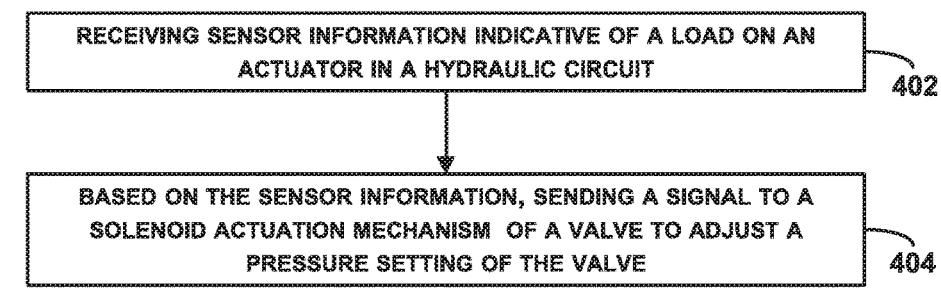
FIG. 10 illustrates a flowchart of a method for controlling a hydraulic circuit, in accordance with an example implementation.

FIG. 10 is a flowchart of a method 400 for controlling a hydraulic circuit, in accordance with an example implementation. The method 400 could, for example, be performed by a controller such as the controller 302.

The method 400 may include one or more operations, or actions as illustrated by one or more of blocks 402-404. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and operations disclosed herein, the flowchart shows operation of one possible implementation of present examples. In this regard, each block may represent a module, a segment, or a portion of program code, which includes one or more instructions executable by a processor or a controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 400 and other processes and operations disclosed herein, one or more blocks in FIG. 10 may represent circuitry or digital logic that is arranged to perform the specific logical operations in the process.

At block 402, the method 400 includes receiving sensor information indicative of a load on an actuator in a hydraulic circuit. As mentioned above, a hydraulic circuit such as the hydraulic circuit 300 could include one or more pressure sensors 304, 306 coupled to respective chambers of a hydraulic actuator. The controller 302 may receive information from the pressure sensors 304, 306 and may accordingly determine a magnitude the load 114 that the actuator 104 is subjected to. Additionally or alternatively, the hydraulic circuit may include a load cell that may provide to the controller 302 information indicative of the magnitude of the load 114. Other parameters or variables can be used to indicate the magnitude of the load 114. For instance, variation in pressure level of the pilot pressure fluid signal could be used. Also, parameters of a machine including parameters associated with the actuator 104 could be used, such as position or speed of a piston indicated by a position or velocity sensor. As another example for illustration, if the actuator 104 drives a drill of a vertical drilling machine, for instance, a length of the drill could be used to indicate a weight that the drill is subjected to. As another example, wind speed could be used to indicate a particular type of load on an actuator. Other example parameters could be used based on the type of application.

At block 404, the method 400 includes, based on the sensor information, sending a signal to the solenoid actuation mechanism 206, 291 of the valve 200, 290 to adjust the pressure setting of the valve 200, 291. As described above, the controller 302 may provide a signal to the solenoid coil 251 to cause the armature 253, 291 to apply a force on the solenoid spring 260, 297 and accordingly adjust the pressure setting of the valve 200, 290.

For example, in an overrunning load case where the piston 108 retracts a large negative load 114 acting with gravity assistance, a large induced pressure in the chamber 116 and a low pressure in the chamber 118 result. Accordingly, the controller 302 might not send a signal to the solenoid coil 251 or may send a signal with a small magnitude so as to have a high pressure setting for the valve 200, 290 and lower the load 114 controllably. As the hydraulic circuit operates and the actuator 104 moves, the load 114 may change (e.g., the angle of the actuator 104 relative to the ground surface may change). For instance, the load 114 may be begin to decrease or change to a positive load where pressurized fluid in communicated to the chamber 118 to cause the piston 108 to retract and pull the load 114. In this case, pressure level in the chamber 116 may be reduced and the pilot pressure fluid signal may have a high pressure level. Accordingly, the controller 302 may send a signal to the solenoid coil 251 to decrease the pressure setting of the valve 200, 290. As such, the controller 302 may continually adjust the pressure setting of the valve 200, 290 during operation of the hydraulic circuit 300 based on the sensor information.

Figure 11:
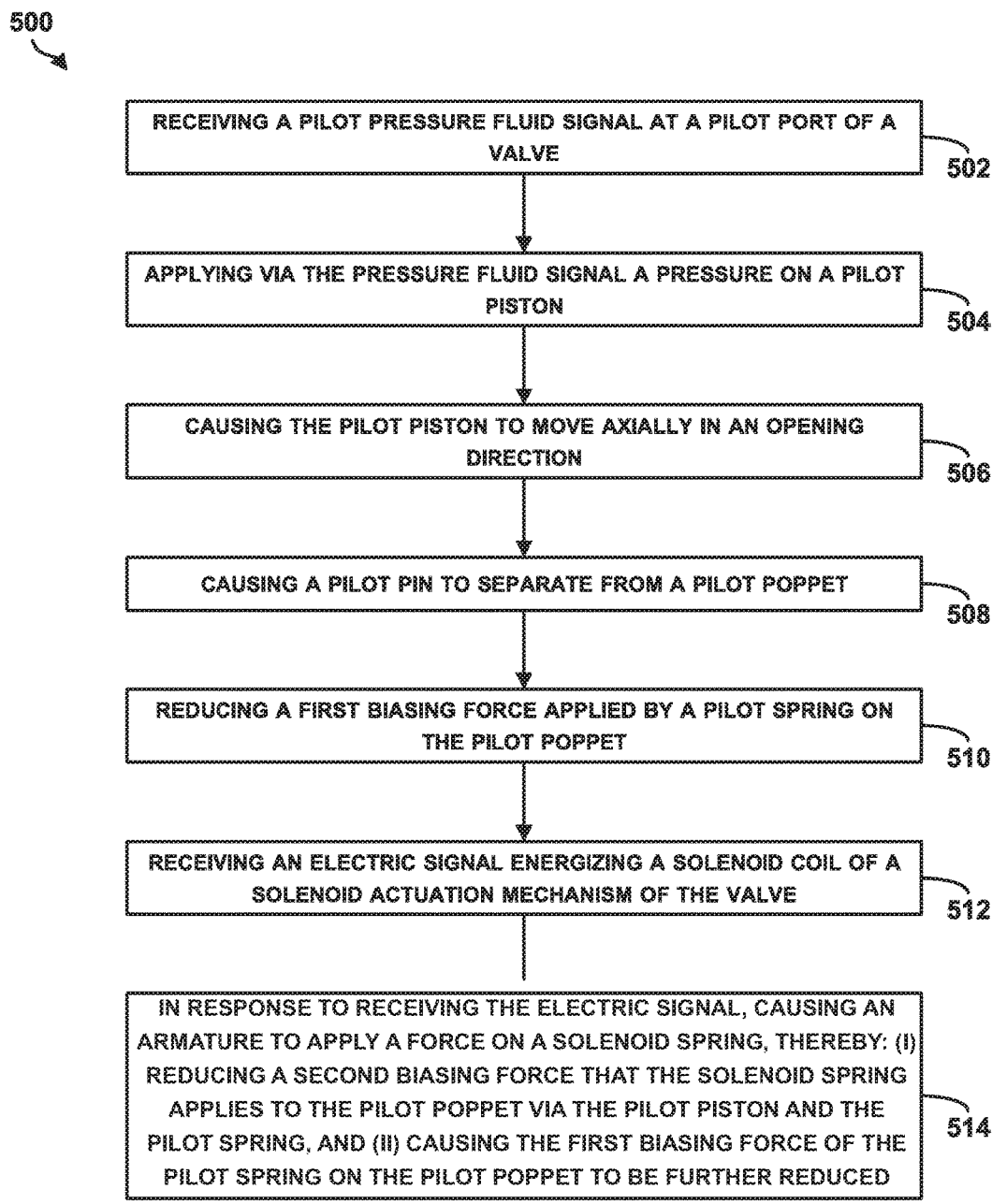
FIG. 11 illustrates a flowchart of a method for operating a valve, in accordance with an example implementation.

FIG. 11 illustrates a flowchart of a method 500 for operating a valve, in accordance with an example implementation. The method 500 shown in FIG. 11 presents an example of a method that could be used with the valve 200, 290, shown throughout the Figures, for example. The method 500 may include one or more operations, functions, or actions as illustrated by one or more of blocks 502-514. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 502, the method 500 includes receiving the pilot pressure fluid signal at the pilot port 247 of the valve 200, 290.

At block 504, the method 500 includes applying via the pressure fluid signal a pressure on the pilot piston 242. The pilot pressure fluid signal is communicated through the slanted channels 248A, 248B to the groove 280 of the pilot piston 242, and the pilot pressure fluid signal then applies a pressure on the pilot piston 242 in the proximal direction.

At block 506, the method 500 includes causing the pilot piston 242 to move axially in an opening (proximal) direction. As the pilot pressure fluid signal acts on that areas $A_1$ and $A_2$ shown in FIG. 5, a force acts on the pilot piston 242 in the proximal or opening direction against the force applied to the pilot piston 242 via the solenoid spring 260, 297. When the force that the pilot pressure fluid signal applies to the pilot piston 242 reaches a particular force level that overcomes the biasing force of the solenoid spring 260, 297, the pilot piston 242 moves in the opening direction.

At block 508, the method 500 includes causing the pilot pin 244 to separate from the pilot poppet 238. The pilot pin 244 is coupled to the pilot piston 242, and as mentioned above the pilot pin 244 contacts or rests against the pilot poppet 238 until the force from the pilot pressure fluid signal causes the pilot piston 242 to move axially in the proximal or opening direction, causing the pilot pin 244 to disengage or separate from the pilot poppet 238.

At block 510, the method 500 includes reducing a biasing force applied by the pilot spring 246 on the pilot poppet 238. As mentioned above, the pilot spring 246 is disposed between the pilot piston 242 and the pilot poppet 238 and biases the pilot poppet 238 in the distal or closing direction to seat the pilot poppet 238 at the pilot seat 236. When the pilot piston 242 moves away from the pilot poppet 238 due to the force of the pilot pressure fluid signal, a length of the pilot spring 246 increases, and thus the biasing force that the pilot spring 246 applies to the pilot poppet 238 decreases. As a result, the pressure setting of the valve 200, 290 is reduced.

At block 512, the method 500 includes receiving an electric signal energizing the solenoid coil 251 of the solenoid actuation mechanism 206, 291 of the valve 200, 290. A controller of the hydraulic system or hydraulic circuit (e.g., the hydraulic circuit 300) may receive information indicating a particular pressure level at a chamber of an actuator or indicating a magnitude of the load that the actuator is subjected to, and accordingly the controller may provide a command or electric signal to the solenoid coil 251 to adjust the pressure setting of the valve 200, 290. As mentioned above, many other variables could be used to indicate the magnitude of the load that the actuator is subject to based on the application in which the actuator is used. Thus, any other type of sensor could be used to provide information to the controller that indicates the magnitude of the load or a change in magnitude of the load.

At block 514, the method 500 includes, in response to receiving the electric signal, causing the armature 253, 293 to apply a force on the solenoid spring 260, 297 thereby reducing the biasing force that the solenoid spring 260, 297 applies to the pilot piston 242. Reducing the biasing force that the solenoid spring 260, 297 applies to the pilot piston 242 also reduces the biasing force that the pilot piston 242 applies to the pilot poppet 238 via the pilot spring 246, thus causing the biasing force of the pilot spring 246 on the pilot poppet 238 to be further reduced. As such, the pressure setting of the valve 200, 290 is further reduced.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve comprising:
   a housing having a pilot port on an exterior peripheral surface of the housing;
   a main stage;
   a pilot stage comprising: (i) a pilot poppet axially movable in the housing, (ii) a pilot piston disposed in the housing longitudinally adjacent to the pilot poppet, (iii) a pilot pin coupled to the pilot piston and disposed between the pilot piston and the pilot poppet such that the pilot pin contacts the pilot poppet, and (iv) a pilot spring disposed about an exterior peripheral surface of the pilot pin between the pilot piston and the pilot poppet, such that the pilot spring applies a biasing force on the pilot poppet in a closing direction; and
   a pilot seat member disposed between the main stage and the pilot stage, wherein the pilot seat member is configured to form a pilot seat for the pilot poppet, and wherein when a pilot pressure fluid signal is received through the pilot port of the housing, the pilot pressure fluid signal applies a pressure on the pilot piston causing the pilot piston to move axially in an opening direction, thereby causing the pilot pin to separate from the pilot poppet and reducing the biasing force applied by the pilot spring on the pilot poppet to facilitate unseating the pilot poppet.

2. The valve of claim 1, wherein the main stage comprises: (i) a first port and a second port, (ii) a main piston configured to move axially in the housing, and (iii) a main chamber formed within the housing, wherein the main piston defines a main orifice configured to communicate fluid from the first port to the main chamber, wherein the pilot seat member defines a damping orifice formed as a channel bounded by an interior peripheral surface of the pilot seat member, wherein a proximal end of the damping orifice forms the pilot seat for the pilot poppet, wherein, when pressurized fluid is received at the first port, the pressurized fluid is communicated through the main orifice, the main chamber, and the damping orifice to act on the pilot poppet in the opening direction.

3. The valve of claim 2, wherein as the biasing force applied by the pilot spring on the pilot poppet is reduced to a predetermined force value, the pressurized fluid causes the pilot poppet to be unseated, thereby allowing pilot flow through the damping orifice and at least one cross hole disposed in the pilot seat member to the second port.

4. The valve of claim 3, wherein the pilot flow causes a pressure drop across the main orifice from the first port to the main chamber, thereby causing the pressurized fluid received at the first port to apply a force on the main piston in the opening direction, causing the main piston to move axially within the housing exposing the second port and allowing main flow from the first port to the second port.

5. The valve of claim 1, further comprising:
   a solenoid actuation mechanism comprising: (i) a solenoid tube coupled to a proximal end of the housing, (ii) a solenoid coil disposed about the solenoid tube, (iii) an armature disposed in the solenoid tube and axially movable therein, (iv) a solenoid pin disposed in the solenoid tube and in the armature, such that the solenoid pin is axially movable within the armature, and (v) a solenoid spring interacting with the solenoid pin and configured to apply a respective biasing force on the pilot poppet in the closing direction via the pilot piston and the pilot spring.

6. The valve of claim 5, wherein, when the solenoid coil is energized, the armature applies a force on the solenoid spring in the opening direction, thereby reducing the respective biasing force that the solenoid spring applies to the pilot poppet via the pilot piston and the pilot spring, causing the biasing force of the pilot spring on the pilot poppet to be further reduced.

7. The valve of claim 1, wherein the pilot piston includes a groove on an exterior peripheral surface of the pilot piston, wherein the groove is fluidly coupled to the pilot port of the housing, wherein the groove is bounded by a first annular surface area and a second annular surface area, wherein when the pilot pressure fluid signal is received through the pilot port of the housing, the pilot pressure fluid signal is communicated to the groove and applies a first force on the first annular surface area and a second force on the second annular surface area, wherein the first annular surface area is larger than the second annular surface area, such that the first force is larger than the second force, thereby causing the pilot piston to move in the opening direction.

8. The valve of claim 1, wherein the main stage comprises (i) a main sleeve disposed in the housing, wherein the main sleeve defines a first port and a second port, and (ii) a main piston disposed in the main sleeve and configured to move axially therein, and wherein the valve further comprises:
   a reverse flow piston disposed at the first port in the main sleeve and axially movable within the main sleeve; and
   a reverse flow check spring that biases the reverse flow piston toward the main piston, such that the reverse flow piston operates as a seat for the main piston, wherein when pressurized fluid is received at the second port, the pressurized fluid applies a force on the reverse flow piston against the reverse flow check spring causing the reverse flow piston to move axially within the main sleeve exposing the second port, thereby allowing flow of the pressurized fluid from the second port to the first port.

9. A valve comprising:
   a main stage;
   a pilot stage comprising: (i) a pilot sleeve, (ii) a pilot poppet disposed within the pilot sleeve and axially movable therein, (iii) a pilot piston disposed within the pilot sleeve longitudinally adjacent to the pilot poppet, (iv) a pilot pin coupled to the pilot piston and disposed between the pilot piston and the pilot poppet such that the pilot pin contacts the pilot poppet, and (v) a pilot spring disposed about an exterior peripheral surface of the pilot pin and floating between the pilot piston and the pilot poppet such that the pilot spring applies a first biasing force on the pilot poppet in a closing direction;
   a pilot seat member disposed between the main stage and the pilot stage, wherein the pilot seat member is configured to form a pilot seat for the pilot poppet, and wherein when a pilot pressure fluid signal is received through a pilot port on an exterior peripheral surface of a housing, the pilot pressure fluid signal applies a pressure on the pilot piston causing the pilot piston to move axially in an opening direction, thereby causing the pilot pin to separate tram the pilot poppet and reducing the first biasing force applied by the pilot spring on the pilot poppet; and a solenoid actuation mechanism comprising: (i) a solenoid tube, (ii) a solenoid coil disposed about the solenoid tube, (iii) an armature disposed in the solenoid tube and axially movable therein, (iv) a solenoid pin disposed in the solenoid tube and in the armature, such that the solenoid pin is axially movable within the armature, and (v) a solenoid spring interacting with the solenoid pin and configured to apply a second biasing force on the pilot poppet in the dosing direction via the pilot piston and the pilot spring.

10. The valve of claim 9, wherein, when the solenoid coil is energized, the armature applies a force on the solenoid spring in the opening direction, thereby reducing the second biasing force that the solenoid spring applies to the pilot poppet via the pilot piston and the pilot spring, causing the first biasing force to be further reduced.

11. The valve of claim 9, wherein the main stage comprises (i) a main sleeve defining a first port and a second port, (ii) a main piston disposed in the main sleeve and configured to move axially therein, and (iii) a main chamber formed within the main sleeve, wherein the main piston defines a main orifice configured to communicate fluid from the first port to the main chamber, wherein the pilot seat member defines a damping orifice formed as a channel bounded by an interior peripheral surface of the pilot seat member, wherein a proximal end of the damping orifice forms the pilot seat for the pilot poppet, wherein, when pressurized fluid is received at the first port, the pressurized fluid is communicated through the main orifice, the main chamber, and the damping orifice to act on the pilot poppet in the opening direction.

12. The valve of claim 11, wherein as the first biasing force applied by the pilot spring on the pilot poppet is reduced to a predetermined force value, the pressurized fluid causes the pilot poppet to be unseated, thereby allowing pilot flow through the damping orifice and at least one cross hole disposed in the pilot seat member to the second port.

13. The valve of claim 12, wherein the pilot flow causes a pressure drop across the main orifice from the first port to the main chamber, thereby causing the pressurized fluid received at the first port to apply a force on the main piston in the opening direction, causing the main piston to move axially within the main sleeve exposing the second port and allowing main flow from the first port to the second port.

14. A hydraulic system comprising:
a source of pressurized fluid;
a reservoir;
a hydraulic actuator having a first chamber and a second chamber;
a directional control valve configured to direct fluid flow from the source of pressurized fluid to the first chamber of the hydraulic actuator; and
a valve configured to control fluid flow from the second chamber, wherein the valve comprises:
a main stage,
a pilot stage comprising: (i) a pilot sleeve, (ii) a pilot poppet disposed within the pilot sleeve and axially movable therein, (iii) a pilot piston disposed within the pilot sleeve longitudinally adjacent to the pilot poppet, (iv) a pilot pin coupled to the pilot piston and disposed between the pilot piston and the pilot poppet such that the pilot pin contacts the pilot poppet, and (v) a pilot spring disposed about an exterior peripheral surface of the pilot pin and between the pilot piston and the pilot poppet such that the pilot spring applies a biasing force on the pilot poppet in a closing direction, and a pilot seat member disposed between the main stage and the pilot stage, wherein the pilot seat member is configured to form a pilot seat for the pilot poppet, and wherein when a pilot pressure fluid signal is received through a pilot port on an exterior surface of a housing, which pilot port is fluidly coupled to the first chamber of the hydraulic actuator, the pilot pressure fluid signal applies a pressure on the pilot piston causing the pilot piston to move axially in an opening direction, thereby causing the pilot pin to separate from the pilot poppet and reducing the biasing force applied by the pilot spring on the pilot poppet to facilitate unseating the pilot poppet.

15. The hydraulic system of claim 14, wherein the biasing force is a first biasing force, and wherein the valve further comprises:

a solenoid actuation mechanism comprising: (i) a solenoid tube, (ii) a solenoid coil disposed about the solenoid tube, (iii) an armature disposed in the solenoid tube and axially movable therein, (iv) a solenoid pin disposed in the solenoid tube and in the armature, such that the solenoid pin is axially movable within the armature, and (v) a solenoid spring interacting with the solenoid pin and configured to apply a second biasing force on the pilot poppet in the closing direction via the pilot piston and the pilot spring.

16. The hydraulic system of claim 15, wherein, when the solenoid coil is energized, the armature applies a force on the solenoid spring in the opening direction, thereby reducing the second biasing force that the solenoid spring applies to the pilot poppet via the pilot piston and the pilot spring, causing the first biasing force to be further reduced.

17. The hydraulic system of claim 14, wherein the main stage comprises (i) a main sleeve defining a first port and a second port, (ii) a main piston disposed in the main sleeve and configured to move axially therein, and (iii) a main chamber formed within the main sleeve, wherein the main piston defines a main orifice configured to communicate fluid from the first port to the main chamber, wherein the pilot seat member defines a damping orifice formed as a channel bounded by an interior peripheral surface of the pilot seat member, wherein a proximal end of the damping orifice forms the pilot seat for the pilot poppet, wherein, when pressurized fluid is received at the first port, the pressurized fluid is communicated through the main orifice, the main chamber, and the damping orifice to act on the pilot poppet in the opening direction.

18. The hydraulic system of claim 17, wherein:
as the biasing force applied by the pilot spring on the pilot poppet is reduced to a predetermined force value, the pressurized fluid causes the pilot poppet to be unseated, thereby allowing pilot flow through the damping orifice and at least one cross hole disposed in the pilot seat member to the second port, and the pilot flow causes a pressure drop across the main orifice from the first port to the main chamber, thereby causing the pressurized fluid received at the first port to apply a force on the main piston in the opening direction, causing the main piston to move axially within the main sleeve exposing the second port and allowing main flow from the first port to the second port.

* * * * *